United States Patent
Bekara

(10) Patent No.: US 11,604,299 B2
(45) Date of Patent: Mar. 14, 2023

(54) MIXED-PHASE SOURCE WAVELET ESTIMATION FROM RECORDED SEISMIC DATA

(71) Applicant: PGS Geophysical AS, Oslo (NO)

(72) Inventor: Maiza Bekara, Kingston Upon Thames (GB)

(73) Assignee: PGS GEOPHYSICAL AS, Oslo (NO)

( * ) Notice: Subject to any disclaimer, the term of this patent is extended or adjusted under 35 U.S.C. 154(b) by 262 days.

(21) Appl. No.: 17/126,911

(22) Filed: Dec. 18, 2020

(65) Prior Publication Data

US 2022/0196867 A1   Jun. 23, 2022

(51) Int. Cl.
G01V 1/38 (2006.01)
G01V 1/30 (2006.01)

(52) U.S. Cl.
CPC .......... G01V 1/3843 (2013.01); G01V 1/307 (2013.01); G01V 1/308 (2013.01); G01V 1/3835 (2013.01)

(58) Field of Classification Search
CPC ...... G01V 1/3843; G01V 1/307; G01V 1/308; G01V 1/3835; G01V 2210/1293; G01V 2210/1423; G01V 1/303
See application file for complete search history.

(56) References Cited

U.S. PATENT DOCUMENTS

| | | | | |
|---|---|---|---|---|
| 4,918,670 A | * | 4/1990 | Wang | G01V 1/30 367/59 |
| 5,173,880 A | * | 12/1992 | Duren | G01V 1/282 367/21 |
| 2021/0311215 A1 | * | 10/2021 | Liu | G01V 1/282 |
| 2022/0196867 A1 | * | 6/2022 | Bekara | G01V 1/303 |

OTHER PUBLICATIONS

Lines, L.R. and Ulrych, T.J., "The old the New in Seismic Deconvolution and Wavelet Estimation." 1977, Geophysical Prospecting 25, 512-540.
Pan, Renlong and Nikias, Chrysostomor L.. "The Complex Ceprstrum of Higher Order Cumulants and Nonminimum Phase System Indentification," IEEE Transactions on Acoustics, Speech, and Signal Processing, vol. 36, No. 2, Feb. 1988.
Kang, M.G., et al., "Phase estimation using the bispectrum and its application to image restoration," Optical Engineering, Jul. 1991, vol. 30, No. 7.
Lazear, Gregory D., "Mixed-phase wavelet estimation using fourth-order cumulants," 1993, Society of Exploration Geophysicists.

* cited by examiner

*Primary Examiner* — Daniel Pihulic

(57) ABSTRACT

This disclosure presents processes and systems for estimating a source wavelet from seismic data recorded in a seismic survey of a subterranean formation. In one aspect, a base wavelet is determined based on recorded seismic traces obtained in a seismic survey of a subterranean formation. Processes and systems include a phase-only wavelet based on the base wavelet and the recorded seismic data. An estimated source wavelet is obtained by convolving the base wavelet with the phase-only wavelet. Properties of the subterranean formation are determined based on the estimated source wavelet and the recorded seismic data.

37 Claims, 28 Drawing Sheets

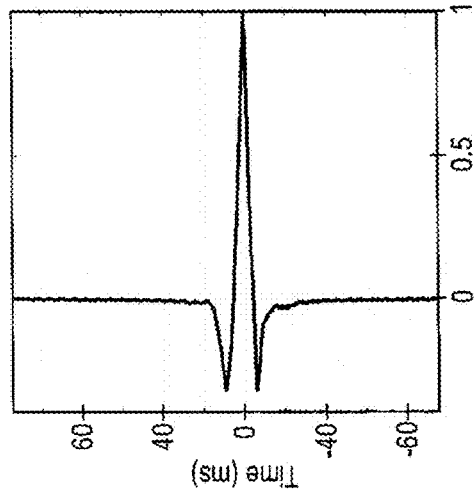
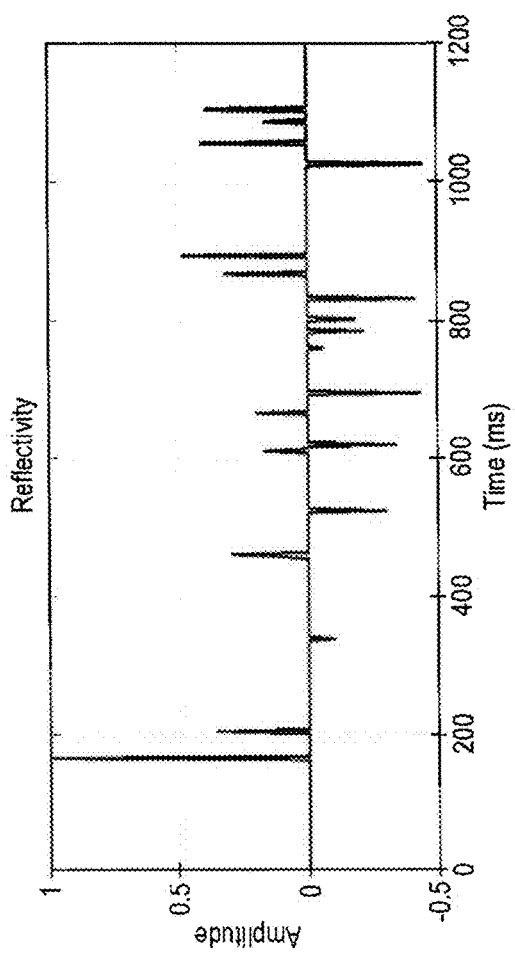
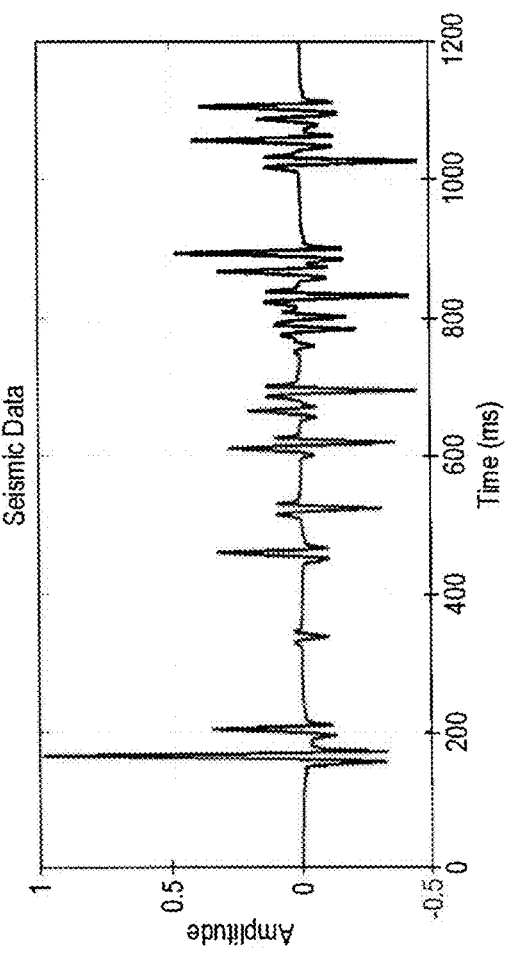
FIG. 17B
FIG. 17A
FIG. 17C

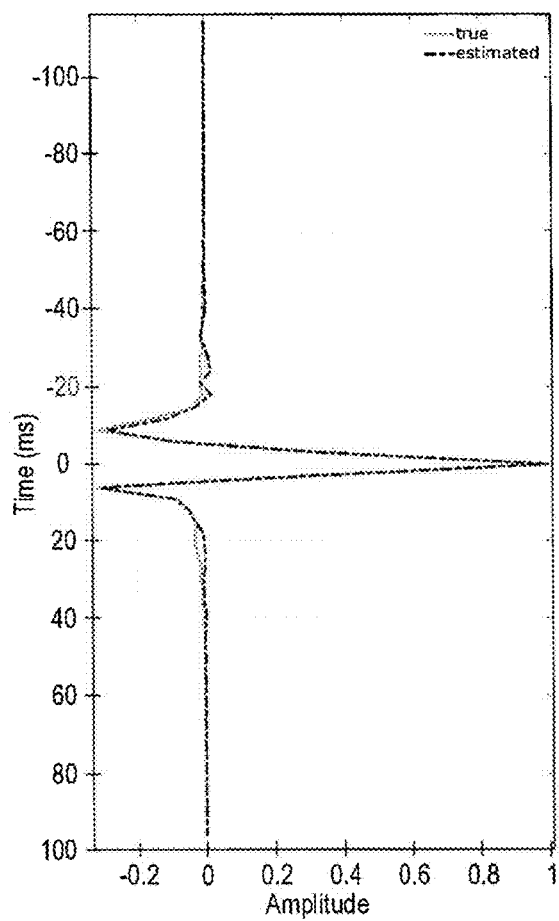
FIG. 18A
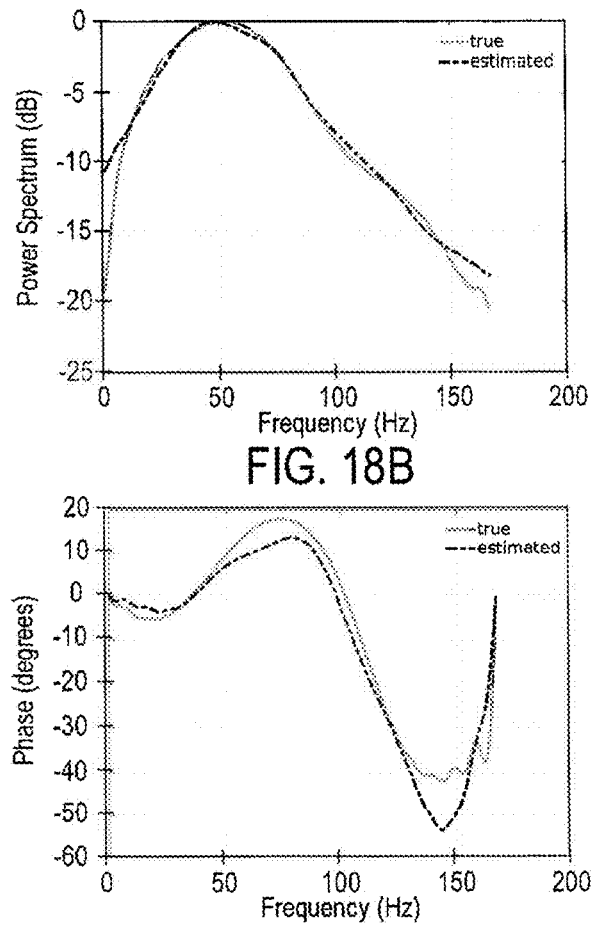
FIG. 18B
FIG. 18C

MIXED-PHASE SOURCE WAVELET ESTIMATION FROM RECORDED SEISMIC DATA

BACKGROUND

Seismology companies invest heavily in the development of seismic surveying equipment and seismic data processing techniques in order to obtain accurate, high-resolution images of subterranean formations. High-resolution images, velocity models, and/or impedance models of a subterranean formation are used to determine the structure of subterranean formations, discover hydrocarbon reservoirs, and monitor hydrocarbon reservoirs during production. A typical marine seismic survey, for example, is performed with one or more survey vessels that tow one or more seismic sources and many streamers through the body of water. The survey vessel contains seismic acquisition equipment, such as a navigation control, seismic source control, seismic receiver control, and recording equipment. A seismic source control controls activation of the one or more seismic sources at selected times or locations. A seismic source comprises an array of airguns that are activated to produce acoustic energy that spreads out in all directions. A portion of the acoustic energy travels down through the water and into a subterranean formation to propagate as sound waves within the subterranean formation. At each interface between different types of liquid, rock and sediment, a portion of the acoustic energy is refracted, a portion is transmitted, and another portion is reflected into the body of water to propagate as an acoustic reflected wavefield toward the water surface. The streamers are elongated spaced apart cable-like structures that may be towed behind a survey vessel in the direction the survey vessel is traveling and are typically arranged substantially parallel to one another. Each streamer contains many seismic receivers or sensors that measure pressure wavefield and/or particle motion wavefield properties of the reflected wavefield. Alternatively, nodes or ocean bottom cables containing receivers may be deployed on the ocean bottom. The receivers in towed streamers, nodes, or ocean bottom cables form a seismic data acquisition surface that records pressure and/or particle motion wavefields as seismic data in the recording equipment. The recorded pressure and/or particle motion wavefields are processed to generate images, velocity models, and/or impedance models of the subterranean formation, enabling geoscientist to identify potential hydrocarbon reservoirs that may be suitable for oil and gas extraction and to monitor oil and gas levels in hydrocarbon reservoirs under production.

DESCRIPTION OF THE DRAWINGS

FIG. 17A-17C shows plots of a reflectivity time series, a zero-phase wavelet and a seismic trace obtained by convolving the zero-phase wavelet with the reflectivity time series.

FIGS. 18A-18C shows of amplitude, power spectra, and phase spectra of a true source wavelet and an estimate source wavelet.

DETAILED DESCRIPTION

An ideal source wavelet represents the waveform, amplitude variation, and phase of a source wavefield produced by a source devise, such as one or more airguns, a vibrator, or an explosive. The source wavelet can ideally be used to designature the recorded seismic data (i.e., remove the source signature in the recorded seismic data or remove it and replace it with a desired one), correct for residual phase in poststack time migrated ("PSTM") images of a subterranean formation, improve a velocity model of the subterranean formation, and perform impedance inversion to obtain an impedance model of the subterranean formation. A source wavelet may also be used as a quality control ("QC") metric to determine the impact of a given process on the phase of the recorded seismic data. However, methods and systems that are currently used in the seismic data processing industry to extract a source wavelet from recorded seismic data are based on the assumption that the source wavelet is a zero-phase wavelet or a minimum phase wavelet. Extraction of source wavelets from recorded seismic data, based on these assumptions. gives an approximate source wavelet that fails to account for the actual phase of the source wavefield. As a result, approximate source wavelets determined using conventional methods and systems do not adequately designature the recorded seismic data, do not properly correct for residual phase in PSTM images, do not give accurate velocity models and impedance models of a subterranean formation, and are not reliable when used for QC.

This disclosure presents processes and systems for estimating a source wavelet from seismic data recorded in a seismic survey of a subterranean formation. The estimated source wavelet is more accurate both in terms of amplitude and phase spectrum compared to an approximate source wavelet obtained using conventional methods and systems. As a result, an estimated source wavelet obtained from recorded seismic data as described below may be used to accurately designature the recorded seismic data, properly correct for residual phase in PSTM images of a subterranean formation, give accurate velocity models and impedance models of a subterranean formation, and can be used in QC.

Seismic Surveying

Figure 1A:
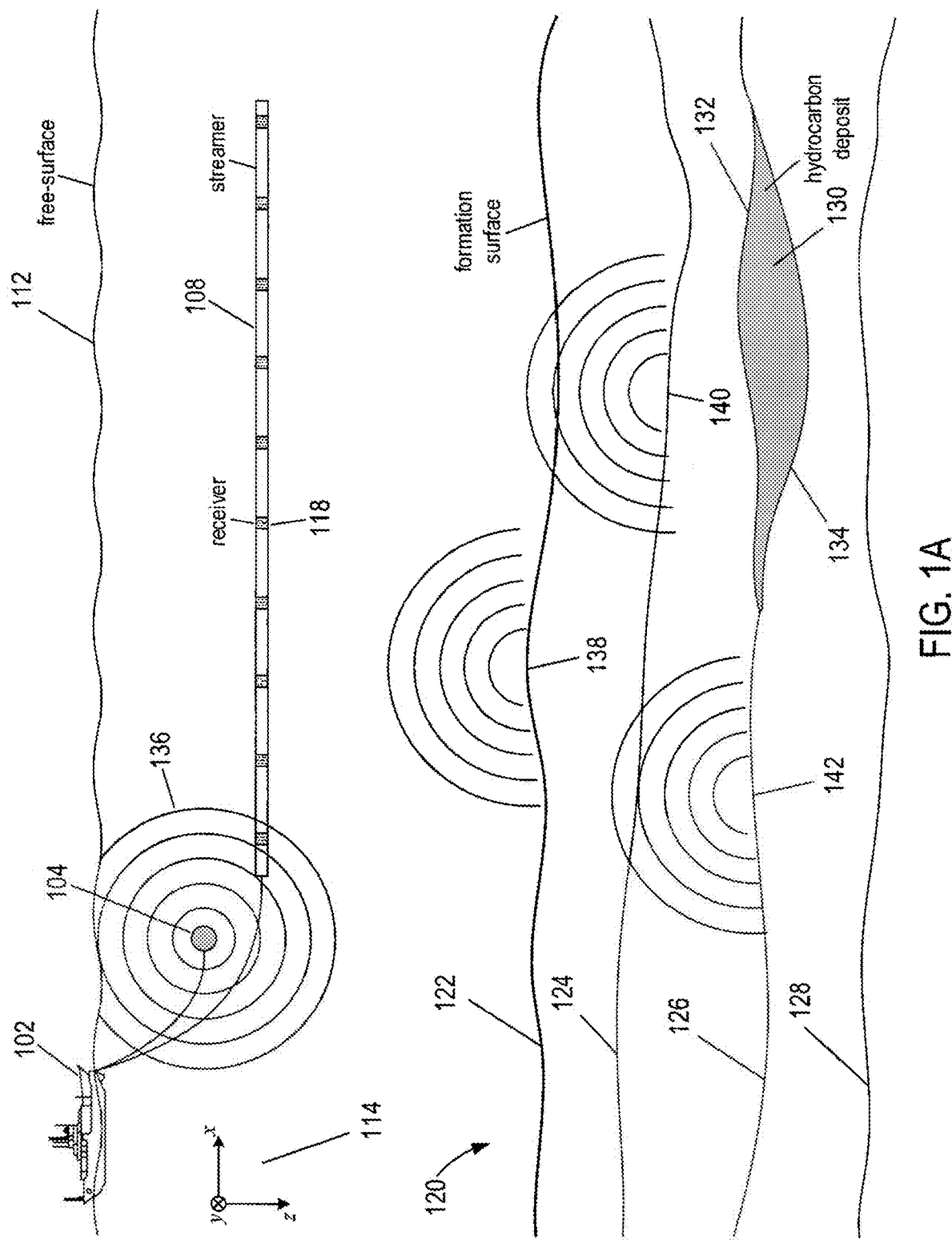
FIGS. 1A-1B show side-elevation and top views of an example marine seismic data acquisition system.
Figure 1B:
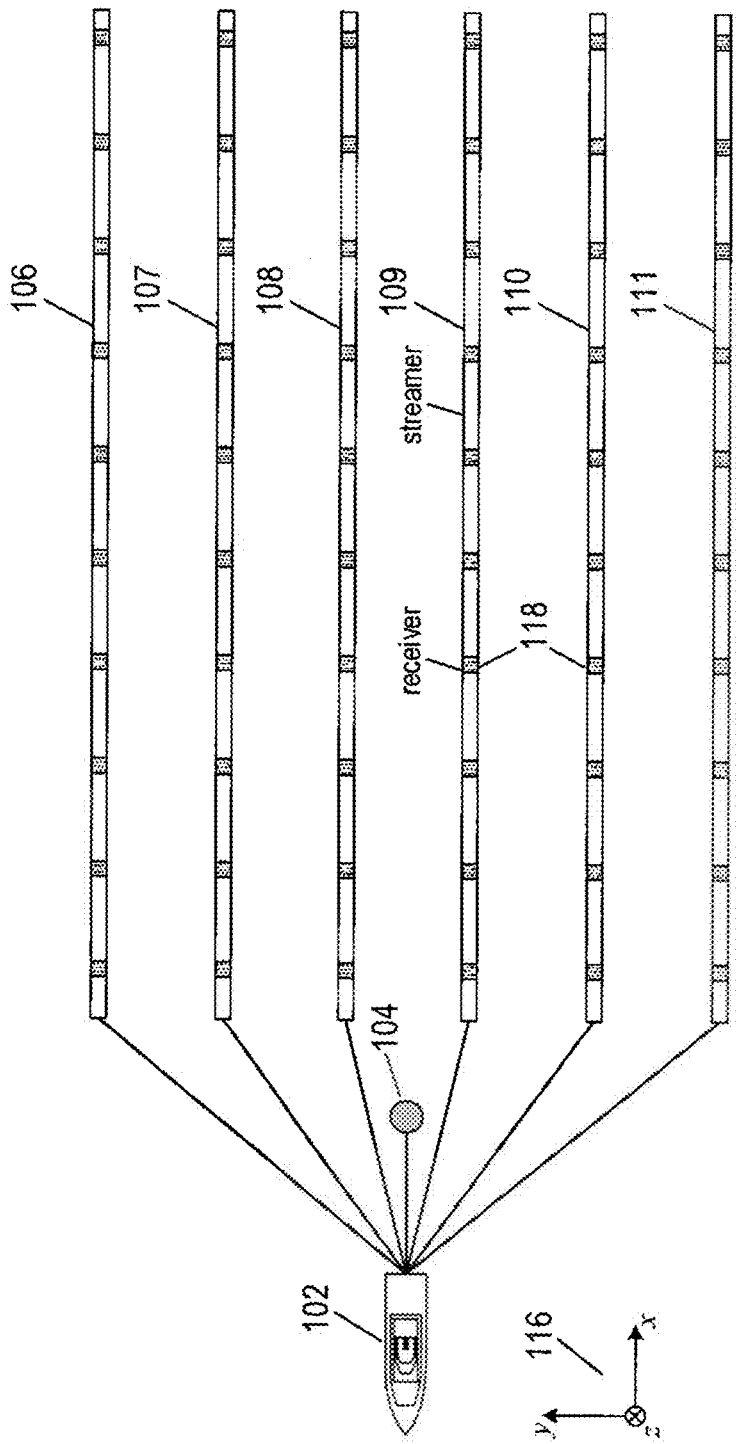

FIGS. 1A-1B show a side-elevation view and a top view, respectively, of an example marine seismic data acquisition system comprising an exploration seismology survey vessel 102 and a seismic source 104. A seismic data acquisition system is not limited to one source as shown in FIGS. 1A-1B. In practice, the number of sources can range from as few as a single source towed by a survey vessel to as many as six or more sources towed by different survey vessels. The body of water can be, for example, an ocean, a sea, a lake, a river, or any portion thereof. In this example, the survey vessel 102 tows six streamers 106-111 located below the free surface of the body of water. Each streamer is attached at one end to the survey vessel 102 via a streamer-data-transmission cable. The illustrated streamers 106-111 ideally form a planar horizontal seismic data acquisition surface of the marine seismic data acquisition system with respect to the free surface 112 of the body of water. However, in practice, the streamers may be smoothly varying due to active sea currents and weather conditions. A seismic data acquisition surface is not limited to a planar horizontal orientation with respect to the free surface 112. The seismic data acquisition surface may be angled with respect to the free surface 112 or one or more of the streamers may be towed at different depths. A seismic data acquisition surface is not limited to six streamers as shown in FIG. 1B. In practice, the number of streamers used to form a seismic data acquisition surface can range from as few as one streamer to as many as 20 or more streamers.

FIG. 1A includes an xz-plane 114, and FIG. 1B includes an xy-plane 116, of the same Cartesian coordinate system having three orthogonal, spatial coordinate axes labeled x, y and z. The coordinate system specifies orientations and coordinate locations within the body of water. The x-direction specifies the position of a point in a direction parallel to the length of the streamers or in the direction the survey vessel is traveling and is referred to as the "inline" direction. The y-direction specifies the position of a point in a direction perpendicular to the x-axis and substantially parallel to the free surface 112 and is referred to as the "crossline" direction. The z-direction, also referred to as the "depth" direction, specifies the position of a point perpendicular to the xy-plane (i.e., perpendicular to the free surface 112) with the positive z-direction pointing downward away from the free surface 112.

The streamers 106-111 are long cables containing power and data-transmission lines that connect receivers represented by shaded rectangles, such as receiver 118, spaced-apart along the length of each streamer to seismic data acquisition equipment, computers, and data-storage devices located onboard the survey vessel 102. Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300-meter intervals in some implementations) along each streamer. Note that in other implementations buoys may be attached to the streamers and used to maintain the orientation and depth of the streamers below the free surface 112.

In FIG. 1A, curve 122, the formation surface, represents a top surface of the subterranean formation 120 located at the bottom of the body of water. The subterranean formation 120 may include many subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by processing the seismic data collected during a marine seismic survey. As the survey vessel 102 moves over the subterranean formation 120, the seismic source 104 produces acoustic energy that spreads out in all directions away from the seismic source 104. For the sake of simplicity, FIG. 1A shows acoustic energy expanding outward from the seismic source 104 as a pressure wavefield 136 represented by semicircles of increasing radius centered at the vibrational source 104. The outwardly expanding wavefronts from the source may be spherical but are shown in vertical plane cross section in FIG. 1A. The outward and downward expanding portion of the pressure wavefield 136 is called the "source wavefield" and any portion of the pressure wavefield 136 reflected downward from the free-surface 112 is called the "ghost source wavefield." The source wavefields eventually reach the formation surface 122 of the subterranean formation 120, at which point the wavefields may be partially reflected from the formation surface 122 and partially refracted downward into the subterranean formation 120, becoming elastic waves within the subterranean formation 120. In the body of water, the source wavefield primarily comprises compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118. As shown in FIG. 1A, waves of significant amplitude may be generally reflected from points on or close to the formation surface 122, such as point 138, and from points on or very close to interfaces in the subterranean formation 120, such as points 140 and 142.

The waves comprising the reflected wavefield may be generally reflected at different times within a range of times following the source wavefield. A point on the formation surface 122, such as the point 144, may receive a pressure disturbance from the source wavefield more quickly than a point within the subterranean formation 120, such as points 146 and 148. Similarly, a point on the formation surface 122 directly beneath the vibrational source 104 may receive the pressure disturbance sooner than a more distant-lying point on the formation surface 122. Thus, the times at which waves are reflected from various points within the subterranean formation 120 may be related to the distance, in three-dimensional space, of the points from the activated source.

Acoustic and elastic waves may travel at different velocities within different materials as well as within the same material under different pressures. Therefore, the travel times of the source wavefield and reflected wavefield may be functions of distance from the source as well as the materials and physical characteristics of the materials through which the wavefields travel. In addition, expanding wavefronts of the wavefields may be altered as the wavefronts cross interfaces and as the velocity of sound varies in the media traversed by the wavefront. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

The seismic source 104 may comprise multiple airguns. The volumes of the air guns may be selected to generate source wavefields over a broad range of frequencies with large volume airguns generating source wavefields with a low fundamental frequency, small volume airguns generating source wavefields with a higher fundamental frequency, and medium volume airguns generating source wavefields with a fundamental frequency in between the low and high fundamental frequency.

Figure 2:
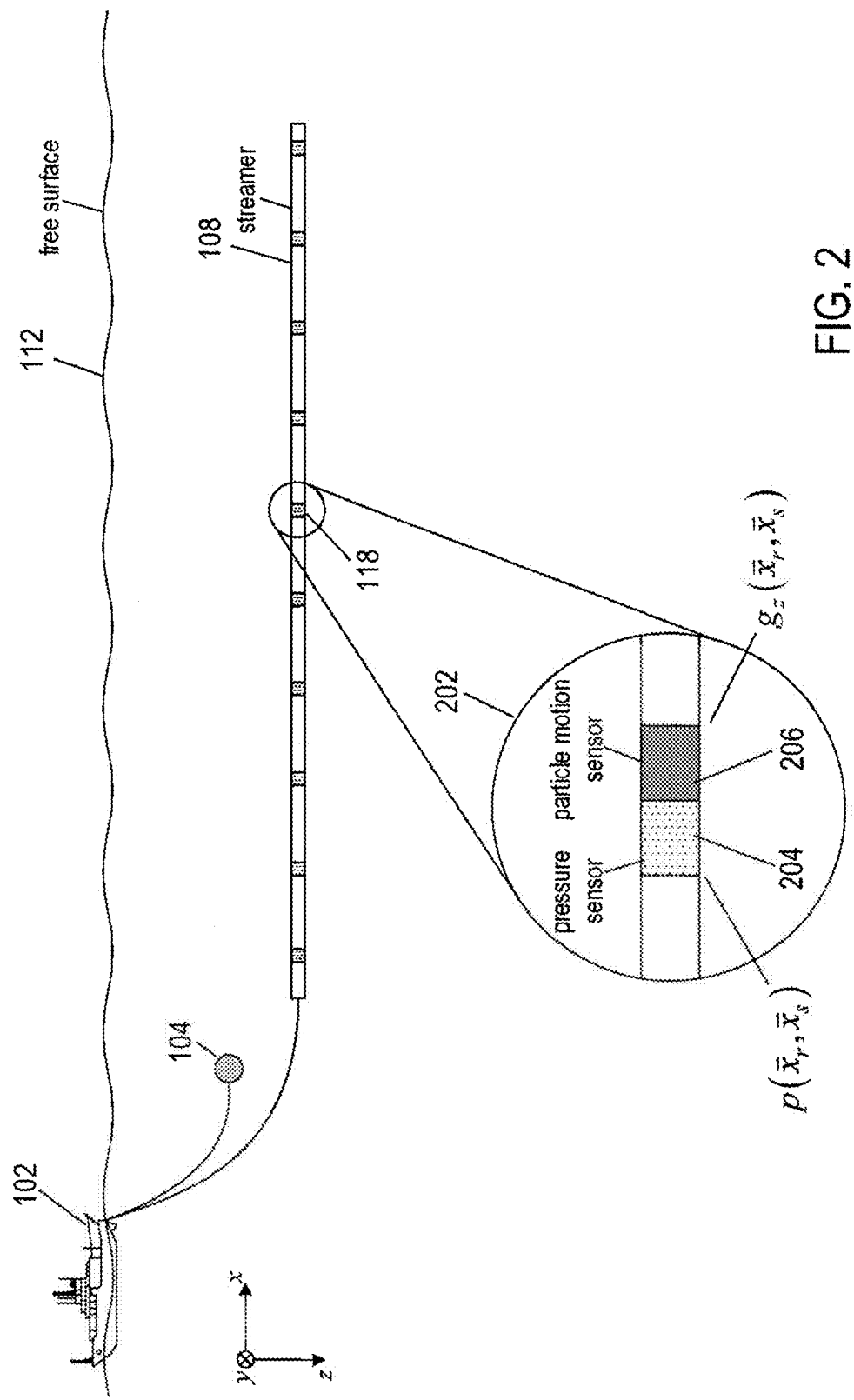
FIG. 2 shows a side-elevation view of an example marine seismic data acquisition system and a magnified view of a receiver.

Each receiver 118 may be a multicomponent sensor including particle motion sensors and a pressure sensor. A pressure sensor that detects variations in water pressure over time. The term "particle motion sensor" is a general term used to refer to a sensor that may be configured to detect particle displacement, particle velocity, or particle acceleration over time. FIG. 2 shows a side-elevation view of the marine seismic data acquisition system and a magnified view 202 of the receiver 118. In this example, the magnified view 202 reveals that the receiver 118 is a multicomponent sensor comprising a pressure sensor 204 and a particle motion sensor 206. The pressure sensor may be, for example, a hydrophone. Each pressure sensor is a non-directional sensor that measures changes in a hydrostatic pressure wavefield over time to produce pressure wavefield data denoted by $p(\vec{x}_r, \vec{x}_s, t)$, where t represents time, and $\vec{x}_r$ represents the Cartesian coordinates $(x_r, y_r, z_r)$ of a receiver. The particle motion sensors are directional sensors that are responsive to water motion in a particular direction. In general, particle motion sensors detect particle motion (i.e., displacement, velocity, or acceleration) in a direction and may be responsive to such directional displacement of the particles, velocity of the particles, or acceleration of the particles. A particle motion sensor that measures particle displacement generates particle displacement data denoted by $g_{\vec{n}}(\vec{x}_r, \vec{x}_s, t)$, where the vector $\vec{n}$ represents the direction along which particle displacement is measured. A particle motion sensor that measures particle velocity (i.e., particle velocity sensor) generates particle velocity wave-field data denoted by $v_{\vec{n}}(\vec{x}_r, \vec{x}_s, t)$. A particle motion sensor that measures particle acceleration (i.e., accelerometer) generates particle acceleration data denoted by $a_{\vec{n}}(\vec{x}_r, \vec{x}_s, t)$. The data generated by one type of particle motion sensor may be converted to another type. For example, particle displacement data may be differentiated to obtain particle velocity wavefield data, and particle acceleration data may be integrated to obtain the particle velocity wavefield data.

The term "particle motion data" refers to particle displacement data, particle velocity wavefield data, or particle acceleration data. The term "seismic data" refers to pressure wavefield data and/or particle motion data. Pressure wavefield data may also be called the "pressure wavefield." Particle displacement data represents a particle displacement wavefield, particle velocity wavefield data represents a particle velocity wavefield, and particle acceleration data represents a particle acceleration wavefield. The particle displacement, velocity, and acceleration wavefield data are correspondingly called particle displacement, velocity, and acceleration wavefields.

The particle motion sensors are typically oriented so that the particle motion is measured in the vertical direction (i.e., $\vec{n}=(0,0,z)$) in which case $g_z(\vec{x}_r, \vec{x}_s, t)$ is called vertical wavefield displacement data, $v_z(\vec{x}_r, \vec{x}_s, t)$ is called vertical velocity wavefield, and $a_z(\vec{x}_r, \vec{x}_s, t)$ is called vertical acceleration wavefield. Alternatively, each receiver may include two additional particle motion sensors that measure particle motion in two other directions, $\vec{n}_1$ and $\vec{n}_2$, that are orthogonal to $\vec{n}$ (i.e., $\vec{n}\cdot\vec{n}_1=\vec{n}\cdot\vec{n}_2=0$, where "·" is the scalar product) and orthogonal to one another (i.e., $\vec{n}_1\cdot\vec{n}_2=0$). In other words, each receiver may include three particle motion sensors that measure particle motion in three orthogonal directions. For example, in addition to having a particle motion sensor that measures particle velocity in the z-direction to give $v_z(\vec{x}_r, \vec{x}_s, t)$, each receiver may include a particle motion sensor that measures the wavefield in the inline direction in order to obtain the inline velocity wavefield, $v_x(\vec{x}_r, \vec{x}_s, t)$, and a particle motion sensor that measures the wavefield in the crossline direction in order to obtain the crossline velocity wavefield, $v_y(\vec{x}_r, \vec{x}_s, t)$. In certain implementations, the receivers may be only pressure sensors, and in other implementations, the receivers may be only particle motion sensors. The three orthogonal velocity wavefields form a velocity wavefield vector $\vec{v}=(v_x, v_y, v_z)$.

The streamers 106-111 and the survey vessel 102 may include sensing electronics and data-processing facilities that allow seismic data generated by each receiver to be correlated with the time each airgun is activated, absolute positions on the free surface 112, and absolute three-dimensional positions with respect to an arbitrary three-dimensional coordinate system. The pressure wavefield and particle motion wavefield may be stored at the receiver and/or may be sent along the streamers and data transmission cables to the survey vessel 102, where the data may be stored electronically, magnetically, or optically on data-storage devices located onboard the survey vessel 102 and/or transmitted onshore to data-storage devices located in a seismic data-processing facility.

Each pressure sensor and particle motion sensor may include an analog-to-digital converter that converts time-dependent analog signals into discrete time series data that consists of consecutively measured values called "amplitudes" separated in time by a sample rate. The time series data generated by a pressure or particle motion sensor is called a "seismic trace," or simply a "trace," which may consist of thousands of samples recorded at a typical sample rate of about 1 to 5 samples per millisecond. A trace includes a recording of a subterranean formation response to acoustic energy that passes from an activated source, into the subterranean formation where a portion of the acoustic energy is reflected and/or refracted, and ultimately detected by a sensor as described above. Each trace records variations in time-dependent amplitudes that correspond to fluctuations in acoustic energy of the wavefield measured by the sensor. In general, each trace is an ordered set of discrete spatial and time-dependent pressure or motion sensor amplitudes denoted by:

$$d(\vec{x}_r, \vec{x}_s, t) = \{A(\vec{x}_r, \vec{x}_s, t_l)\}_{l=0}^{L-1} \quad (1)$$

where d represents a trace of pressure data p, particle displacement data g, particle velocity data v, or a particle acceleration data a;

A represents an amplitude of pressure, particle displacement, particle velocity, or particle acceleration data at the time sample;

$t_l$ is the l-th sample time; and

L is the number of time samples in the trace.

The coordinate location $\bar{x}_r$ of each receiver may be calculated from global position information obtained from one or more global positioning devices located along the streamers and/or the towing vessel, from depth measuring devices, such as hydrostatic pressure sensors, and the known geometry and arrangement of the streamers and receivers. The receiver and source locations vary with time and may also be denoted by $\bar{x}_r = \bar{x}_r(t) = (x_r(t), y_r(t), z_r(t))$ and $\bar{x}_s = \bar{x}_s(t) = (x_s(t), y_s(t), z_s(t))$. Each trace also includes a trace header not represented in Equation (1) that identifies the specific receiver that generated the trace, receiver and source GPS spatial coordinates, receiver depth, and may include time sample rate and the number of time samples.

Reflected wavefields from the subterranean formation typically arrive first at the receivers located closest to the sources. The distance from the sources to a receiver is called the "source-receiver offset," or simply "offset." A larger offset generally results in a longer arrival time delay. The traces are collected to form a "gather" that can be further processed using various seismic data processing techniques to obtain information about the structure of the subterranean formation. The traces may be sorted into different domains, such as a common-shot domain, common-receiver domain, common-receiver-station domain, and common-midpoint domain. For example, a collection of traces sorted into the common-shot domain are called a common-shot gather and a collection of traces sorted into common-receiver domain are called a common-receiver gather. The portion of the acoustic signal reflected into the body of water from the subterranean formation and travels directly to the receivers is called a primary reflected wavefield or simply a "primary." Other portions of the acoustic energy that are reflected upward into the body of water and that reverberate between the free surface and the subterranean formation before reaching the receivers are called free-surface multiple reflected wavefields or simply "free-surface multiples." Other portions of the acoustic energy that are reflected upward into the body of water directly to receivers after having reverberated within the subterranean formation are called subsurface multiple reflections or simply "subsurface multiples."

Figure 3A:
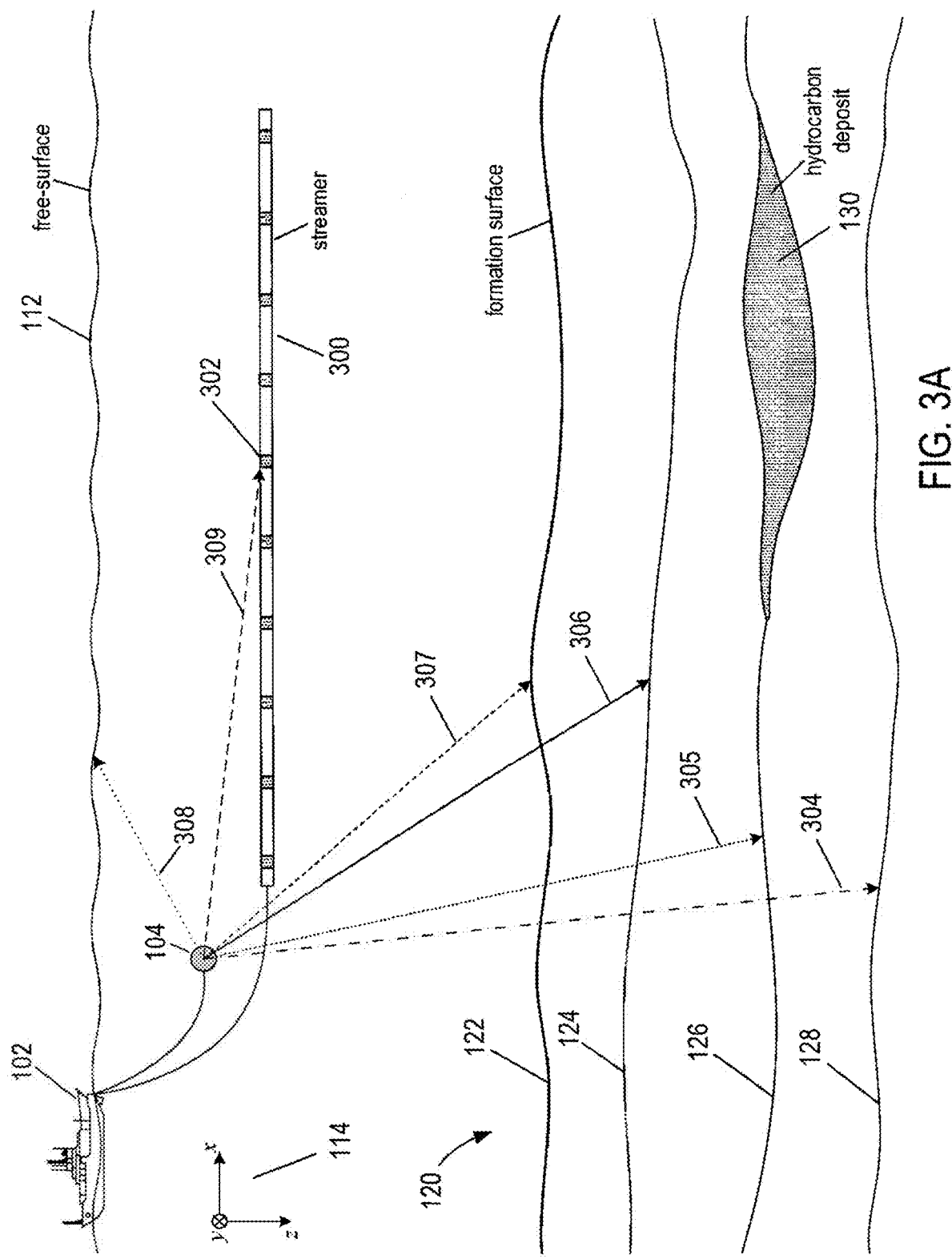
FIGS. 3A-3C show snapshots of different ways in which acoustic energy emitted from a source reverberates between a free surface and a subterranean formation before reaching a receiver.
Figure 3B:
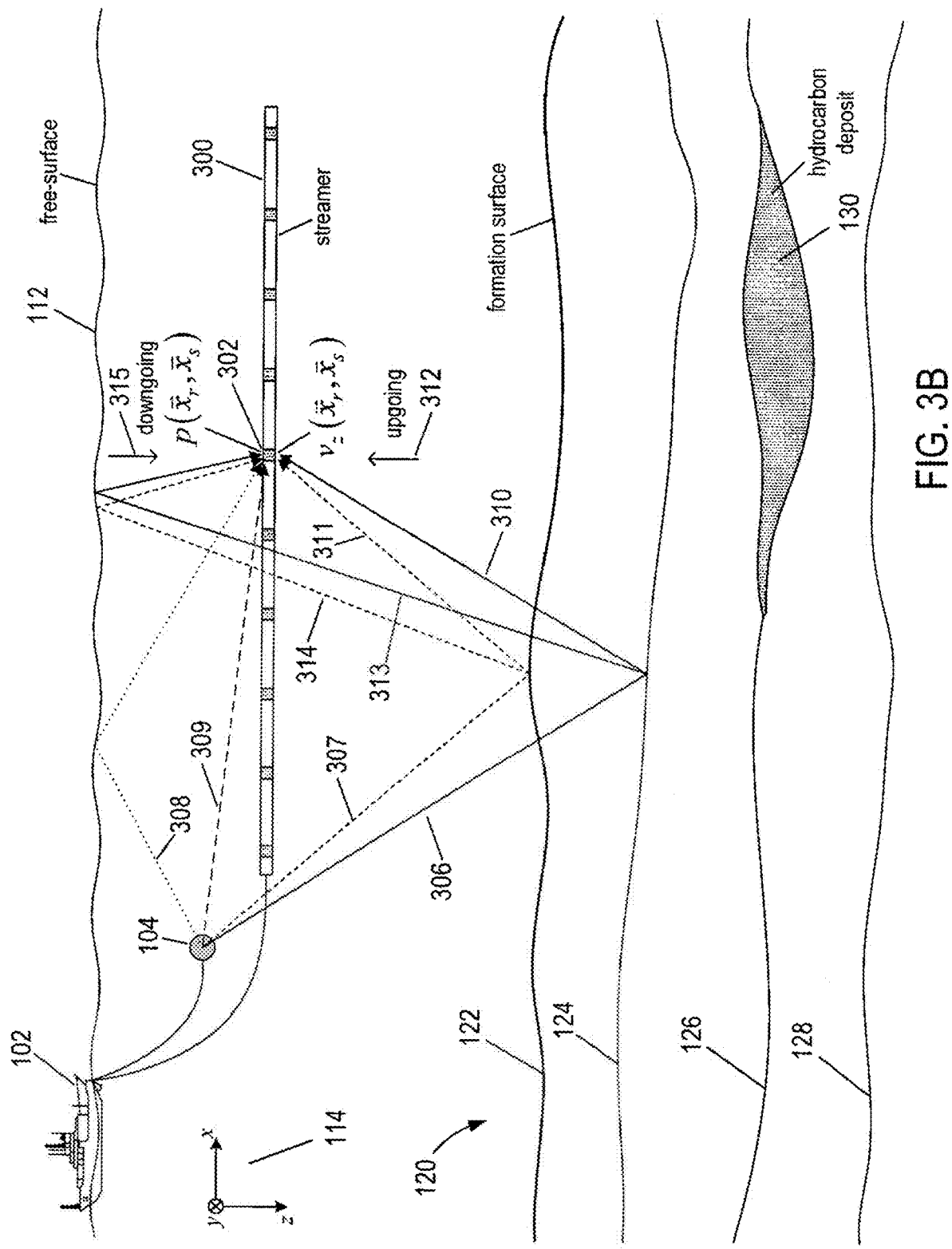
Figure 3C:
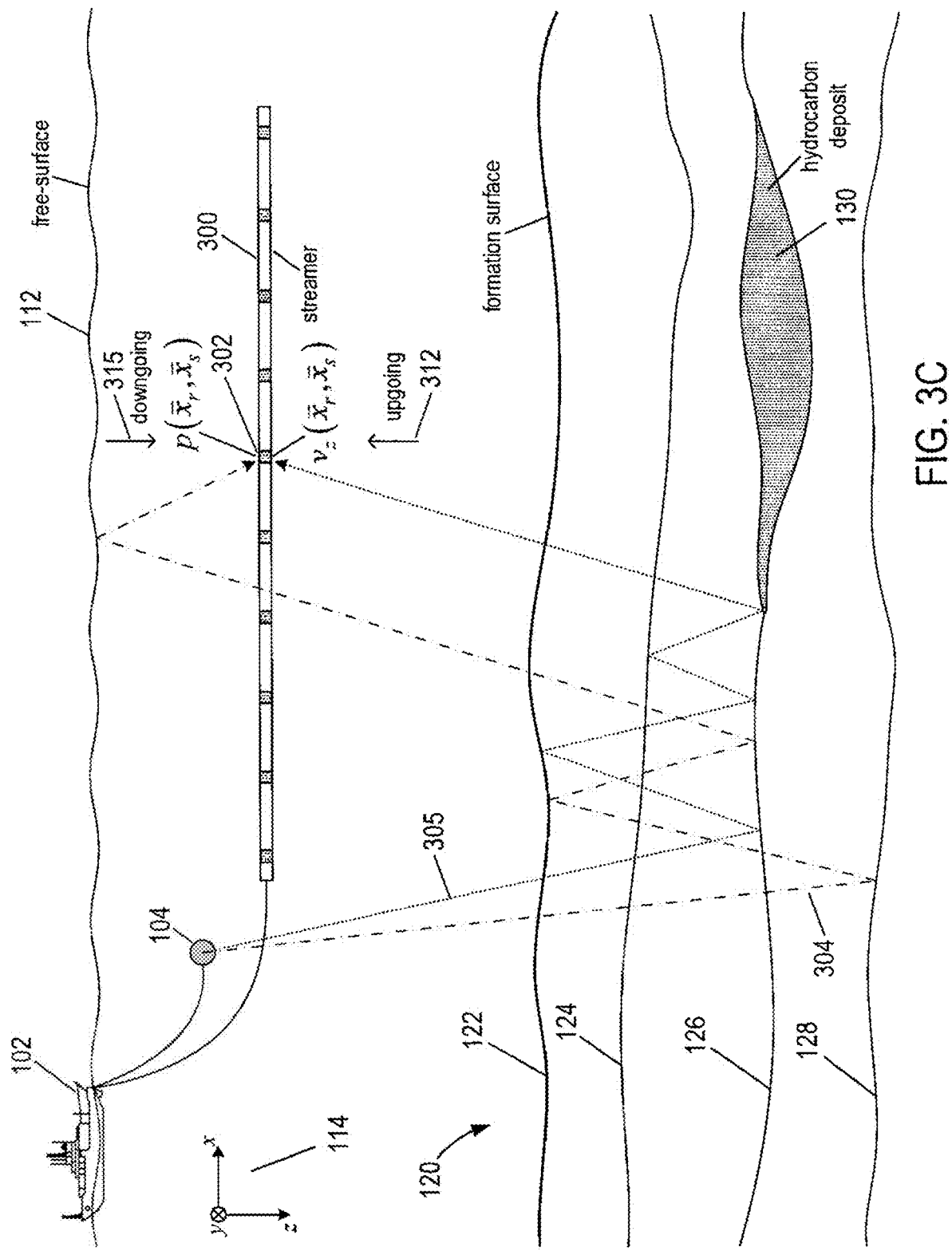

FIGS. 3A-3C show snapshots of different ray paths of acoustic energy emitted from the seismic source 104 and reverberates between the free surface 112 and the subterranean formation 120 before reaching the receiver 302. For the sake of simplicity, FIGS. 3A-3C illustrate only a few of many possible ray paths acoustic energy of an acoustic signal created by the seismic source 104 may travel before reaching the receiver 302. In FIG. 3A, directional arrows 304-309 represent ray paths of different portions of the source wavefield generated by the seismic source 104. For example, ray paths 304-307 represent portions of the source wavefield that penetrate to different interfaces of the subterranean formation 102 and ray path 308 represents a portion of the source wavefield that reaches the free surface 112. Ray path 309 represents the portion of the source wavefield that travels directly to the receiver 302. In FIG. 3B, ray path 308 is extended to present a downward reflection of the source wavefield from the free surface 112 (i.e., ghost source wavefield). Ray paths 310 and 311 represent reflections from the interface 124 and the formation surface 122 that travel directly to the receiver 302, which are called "upgoing primary reflections" or "primaries," as indicated by upgoing directional arrow 312. Ray paths 313 and 314 represent reflections from the interface 124 and the formation surface 122 followed by downward reflections from the free surface 112 before traveling directly to the receiver 302, which are called "downgoing reflections" as indicated by directional arrow 315. In FIG. 3C, ray paths 304 and 305 are extended to represent examples of multiple reflections between interfaces within the subterranean formation 120 and the free surface 112. Extended ray path 304 represents a downgoing free-surface multiple. Extended ray path 305 represents an upgoing multiple. In FIGS. 3B-3C, wavefields that are reflected downward from the free surface 112 before reaching the receivers, as represented by ray paths 313, 314, and 304, are examples of "downgoing wavefields" that may also be called "ghost wavefields" or "receiver ghosts." In FIGS. 3B-3C, wavefields that are reflected upward from the subterranean formation 120 before reaching the receivers, as represented by ray paths 310, 311, and 305, are examples of "upgoing wavefields." Seismic data may also record acoustic energy that propagated along interfaces as head waves (not shown) before being reflected upward to the surface 122. Seismic data may also record acoustic energy that propagated into layers with velocity gradients that increase with depth due to compression, creating diving waves (not shown) that are gradually turned upward to the surface 122.

Figure 3D:
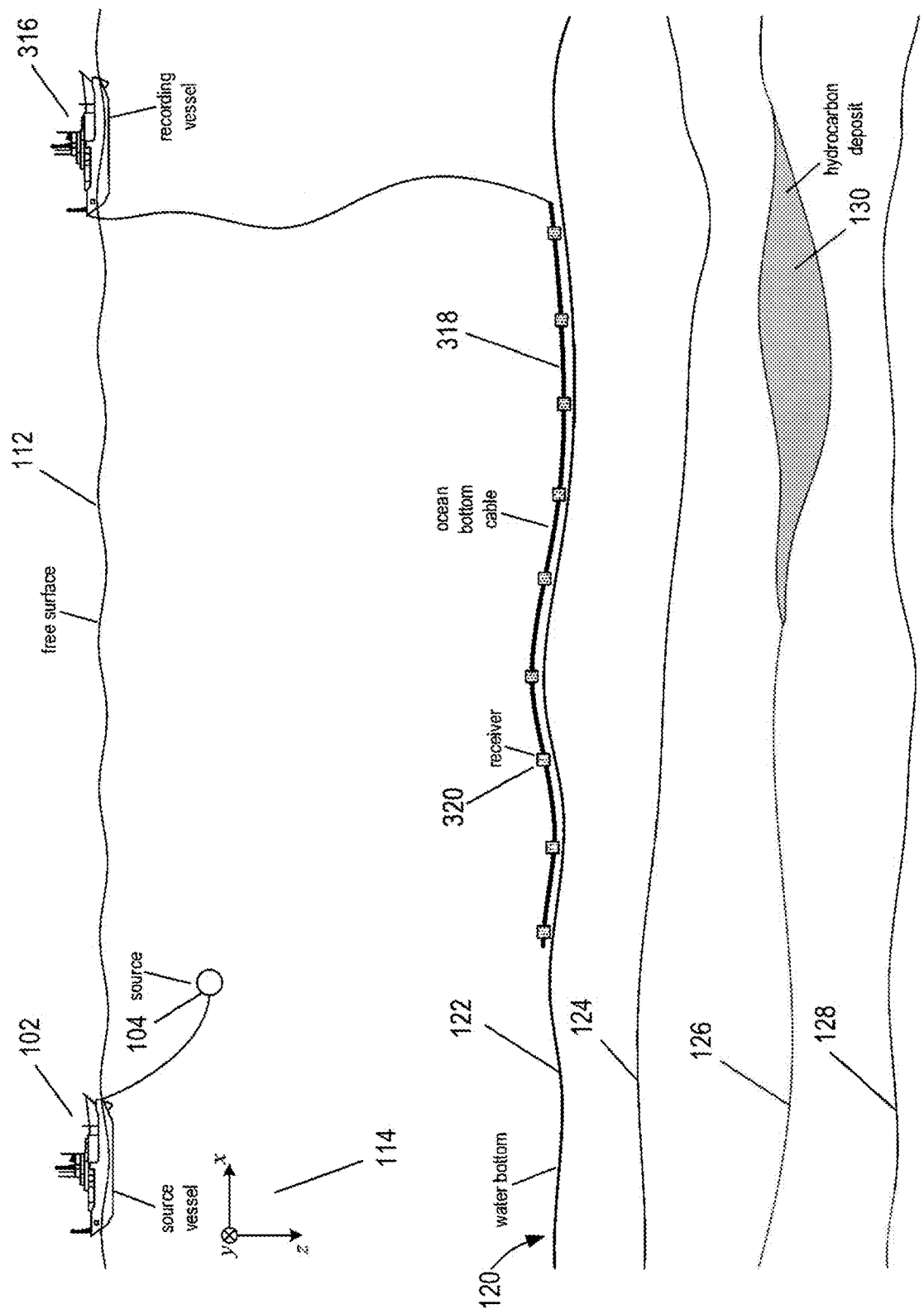
FIG. 3D shows a side-elevation view of an example ocean bottom cable-based seismic data acquisition system.

Subterranean formations may also be surveyed using ocean bottom seismic techniques. In one implementation, these techniques may be performed with ocean bottom cables ("OBCs") laid on or near the water bottom. FIG. 3D shows an example of a marine survey conducted with a source vessel 102 and a recording vessel 316 electronically connected to an OBC 318. In practice, the recording vessel 316 may be connected to any number of OBCs. The OBCs are similar to the towed streamer cables described above in that the OBCs include a number of spaced-apart receivers, such as receiver 320, deployed approximately every 25 to 50 meters, but the OBCs are laid on or near the formation surface 120. As shown in the example of FIG. 3D, the source vessel 102 operates the source 104 as described above and the recording vessel 316 provides power, instrument command and control, and recordation of the seismic data produced by receivers using recording equipment located on board the recording vessel.

In other implementations, ocean bottom nodes ("OBNs") may be deployed along the formation surface. Each node may have collocated pressure and/or particle motion sensors. The OBNs may be electronically connected to an anchored recording vessel that provides power, instrument command and control of the pressure and/or vertical velocity wavefield sent to recording equipment located on board the vessel.

Figure 3E:
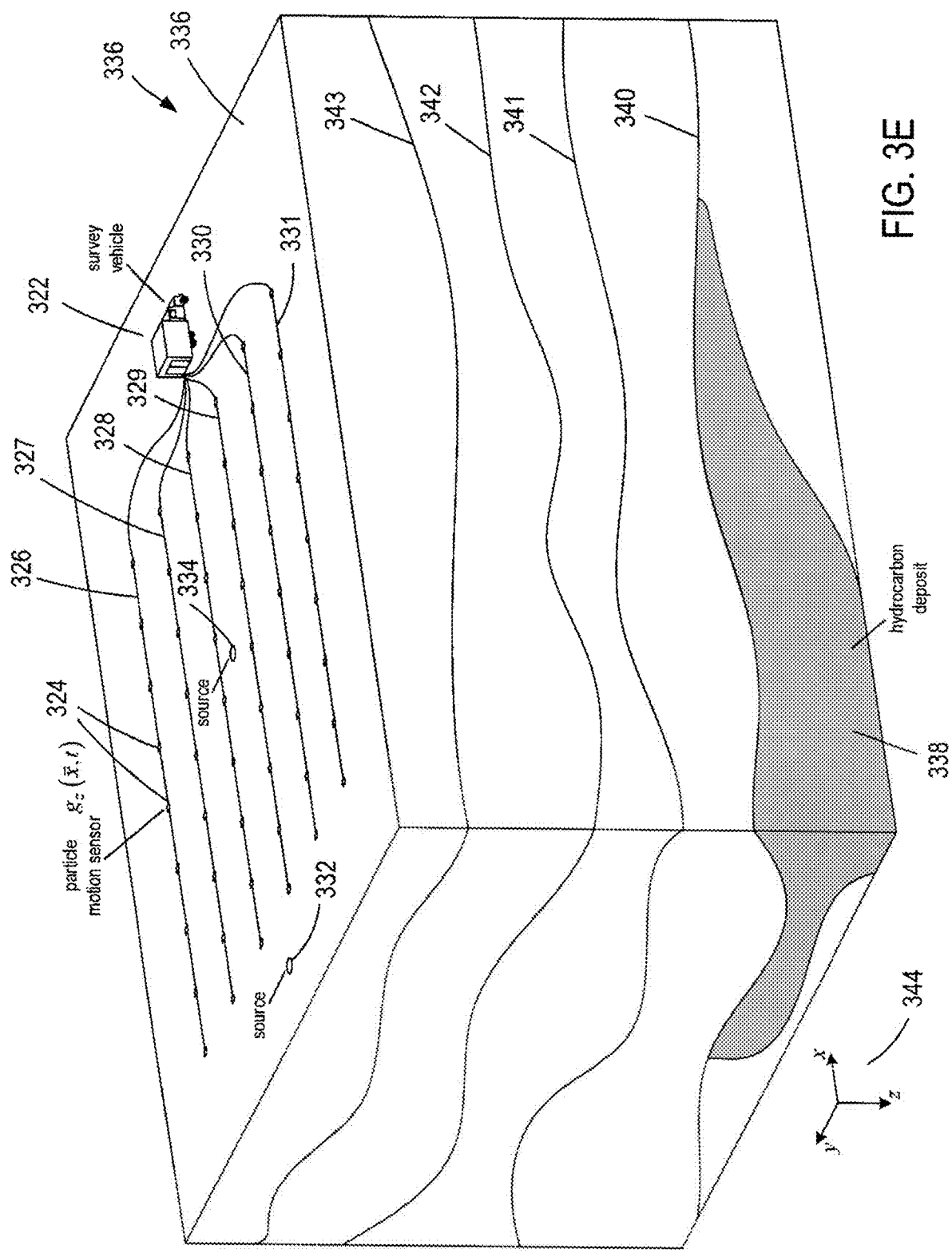
FIG. 3E shows an isometric view of an example land-based seismic data acquisition system.

For land surveys, particle motion sensors are typically deployed at fixed locations on the surface of a subterranean formation and one or more sources may be activated at different locations. FIG. 3E shows an isometric view of an example seismic data acquisition system comprising a survey vehicle 322, particle motion sensors, such as particle motion sensors 314, located along data transmission cables 326-331 that lead to the survey vehicle 322, and two sources 332 and 334. Block 336 represents a volume of a subterranean formation that includes a hydrocarbon deposit 338 located beneath layers of sediment and rock separated by interfaces 340-343. The locations of the sources 332 and 334 and particle motion sensors may be given with reference to a Cartesian coordinates system 344. Examples of sources 322 and 324 may include explosives, vibrators, or thumper trucks, and may be located on formation surface 346 or in boreholes. The particle motion sensors 324 may be geophones placed at grid points on the subterranean formation surface 346 to detect particle motion in the z-direction denoted by $g_z(\vec{x}, t)$. The sources 332 and 334 are activated to generate acoustic energy that travels down into the subterranean formation 336 to produce reflected seismic wavefields that are detected by the particle motion sensors 324 as described above. The particle motion data may be stored at the receivers and/or may be sent along the data transmission cables to the survey vehicle 322, where the data may be stored electronically or magnetically on data-storage devices located in the survey vehicle 322.

Convolutional Model of a Seismic Trace

As explained above, at each boundary between geological layers of a subterranean formation, a portion of the acoustic energy propagating within the subterranean formation is transmitted and a portion is reflected back toward the receivers. Each layer has a different acoustic impedance, which is the resistance of that layer to propagation of acoustic energy. The amount of acoustic energy reflected is called the reflectivity, and the reflectivity is related to the contrast in acoustic impedance of adjacent layers in the subterranean formation.

Figure 4:
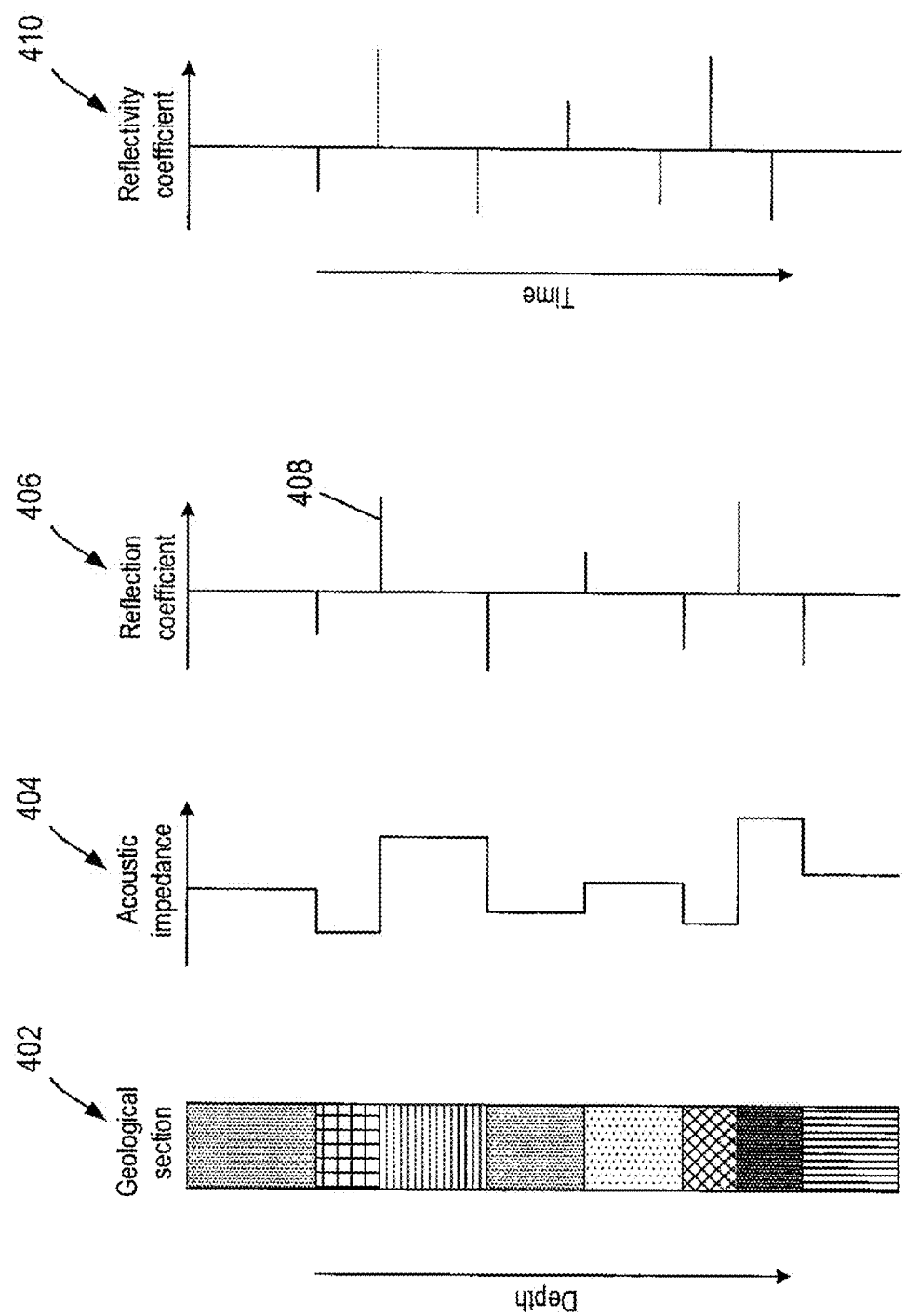
FIG. 4 shows an example relationship between geological layers of a subterranean formation, acoustic impedances of the layers, and reflection coefficients at boundaries between layers.

FIG. 4 shows an example relationship between geological layers of a subterranean formation, hypothetical acoustic impedances of the layers, and reflection coefficients at the boundaries between layers. In FIG. 4, differently shaded blocks represent the lithology of different layers of a geological section 402. Acoustic impedance log 404 shows example impedances of the layers in the geological section 402 with depth. Reflection coefficient log 406 represented by spikes, such as spike 408, correspond to the boundaries between layers. FIG. 4 also shows subsurface reflectivity 410 at the boundaries as a function of time. The subsurface reflectivity 410 represents the ideal type of seismic data a seismic survey and seismic data processing is intended to find because the subsurface reflectivity 410 closely matches the reflection coefficient log 406 and can be used to reveal properties of the subterranean formation, such as structure and lithology of the seismic section 402. In practice, however, each seismic trace records the source wavefield combined with the subsurface reflectivity, a source ghost, various types of free surface and subsurface multiples, and incoherent noise.

The portion of a seismic wavefield recorded in a seismic trace may be expressed using a convolutional model given by $$d_n(t) = r_n(t) * w(t) + \in_n(t) \quad (2)$$

where

"*" represents convolution;

$d_n(t)$ is a seismic trace in Equation (1) with source and receiver coordinates $(\vec{x}_r, \vec{x}_s)$ suppressed;

$r_n(t)$ is the subsurface reflectivity;

$\in_n(t)$ is incoherent noise;

subscript n is a receiver index; and w(t) is a source wavelet.

Note that the convolutional model in Equation (2) is a general approximation of a seismic trace that does not account for certain properties of wave propagation, such as complex and non-zero incident angle ray paths, attenuation, and dispersion. Incoherent noise $\in_n(t)$ results from effects that are not connected with the survey. For example, incoherent noise in a marine survey includes propeller noise, free surface swells, or vibrations created by towing a streamer through a body of water. The incoherent noise $\in_n(t)$ also accounts for approximations to obtain a simple linear convolution in the convolutional model in Equation (2). The source wavelet characterizes variations in the amplitude of the source wavefield produced by the sources 104 and 332, including marine vibrators, land vibrators, and dynamite. For example, if the source wavefield is an impulse, the source wavelet w(t) is a short time series with a finite amplitude and a finite duration.

Figure 5E:
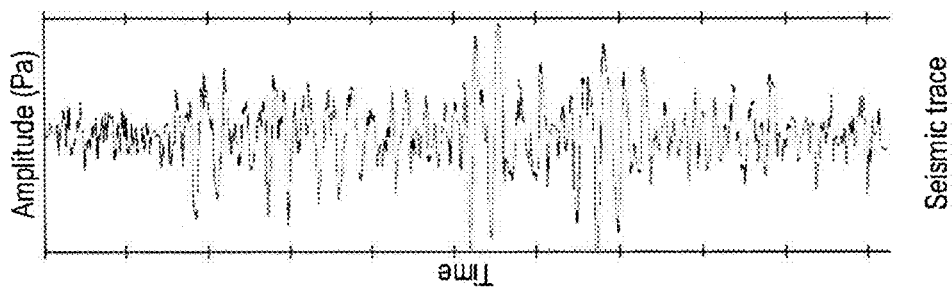
FIGS. 5A-5E illustrate an example of the convolutional model in the time domain using example time series data.
Figure 5D:
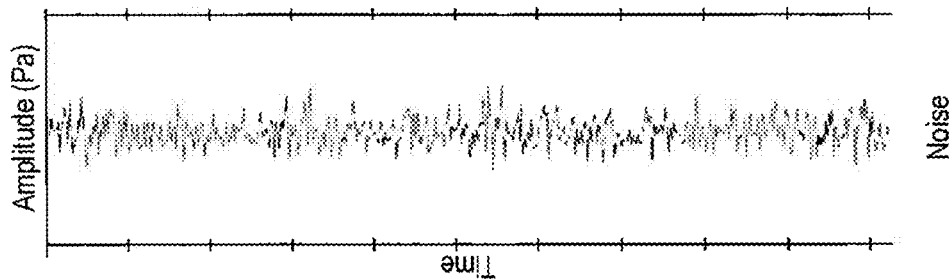
Figure 5C:
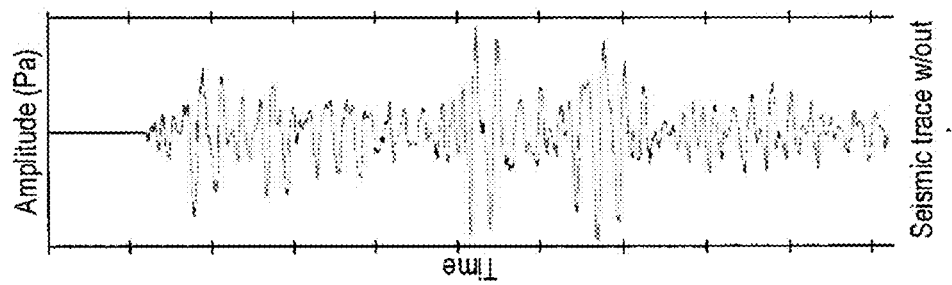
Figure 5B:
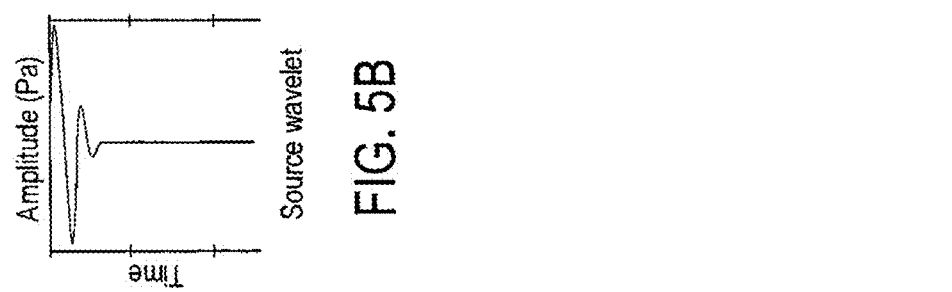
Figure 5A:
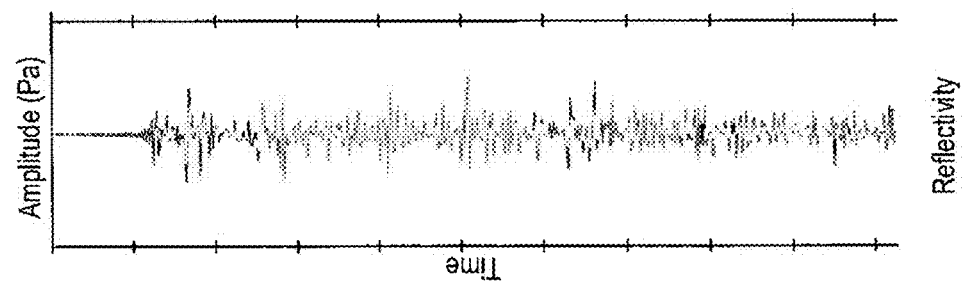

FIGS. 5A-5E illustrate an example of the convolutional model in the time domain using example time series data. FIG. 5A shows an example subsurface reflectivity $r_n(t)$ of a subterranean formation. FIG. 5B shows an example source wavelet w(t) that represents the amplitude of a source wavefield generated by an impulsive source. FIG. 5C shows convolution of the source wavefield w(t) in FIG. 5B with the subsurface reflectivity $r_n(t)$ (i.e., $r_n(t)*w(t)$) to obtain a seismic trace without the effects of noise. FIG. 5D is an example of incoherent noise $\in_n(t)$. FIG. 5E shows a seismic trace $d_n(t)$ that represents the seismic data recorded by a receiver. The seismic trace $d_n(t)$ in FIG. 5E is the $r_n(t)$ subsurface reflectivity in FIG. 5A convolved with the source wavefield w(t) in FIG. 5B and added to the noise $\in_n(t)$ in FIG. 5D.

Conventional Source Wavelet Estimation Models

Estimates of the source wavelet in the convolutional model of Equation (2) have many applications in seismic imaging and seismic data processing. An estimated source wavelet represents amplitude variations of the source wavefield and may be used in quality control ("QC"), to designature the recorded seismic data, to perform phase correction of the recorded seismic data, to perform impedance inversion in reservoir quantitative interpretation, and to perform full-waveform inversion ("FWI") to obtain accurate high-resolution velocity models of the subterranean formation. Conventional techniques for estimating a source wavelet give a minimum-phase source wavelet or a zero-phase source wavelet. However, these techniques are based on assumptions about the phase of the source wavelet that are not in reality valid, and therefore, often lead to an inaccurate estimated source wavelet, which compromises the effectiveness of QC, designaturing of recorded seismic data, phase correction, impedance inversion, and FWI. The assumptions behind typical methods for estimating a wavelet from seismic data include 1. the convolutional model in Equation (2) is valid,
2. the reflectivity, $r_n(t)$, has a white spectrum.
3. the reflectivity, $r_n(t)$, is spatially incoherent,
4. the noise, $\in_n(t)$, is white and spatially incoherent, 5. the noise, $\epsilon_n(t)$, is independent of the reflectivity, and
6. the wavelet, w(t), is estimated within an arbitrary scalar and time shift.

However, the first three assumptions are not always valid for actual seismic data recorded in a survey:

1. The convolutional model in Equation (2) is only valid post migration post stacking when accurate Q amplitude and phase compensation have been applied to the recorded seismic data, preferably as part of the migration operation rather than an additional process post migration.
2. The reflectivity, $r_n(t)$, has a blue spectrum (i.e., energy increases as the frequency increases).
3. The reflectivity, $r_n(t)$, is not spatially incoherent in the presence of layered geological structures. On the other hand, assumptions 4 and 5 are true for adequate noise attenuation and when stacking is performed as a preconditioning step prior to wavelet estimation. Assumption 6 is not a limitation on the convolutional model in Equation (1).

Figures 6A, 6B:
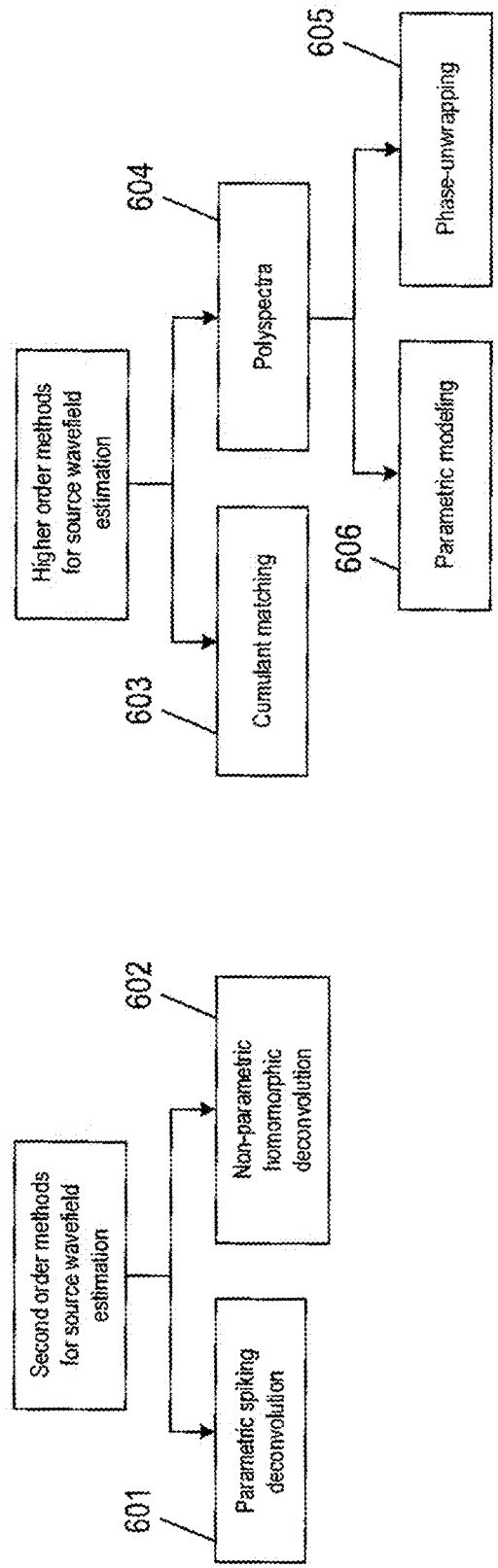
FIGS. 6A-6B represent conventional source wavelet estimation methods.

FIGS. 6A-6B represent conventional source wavelet estimation methods. In FIG. 6A, widely used second-order wavelet estimation methods include parametric spiking deconvolution 601 and non-parametric homomorphic deconvolution 602. Second-order methods are based on autocorrelation of the recorded seismic data or a frequency representation of the power spectrum of the recorded seismic data. With these methods, the phase information associated with the source wavefield is lost and an additional zero-phase assumption, or a minimum phase assumption, is needed to construct the source wavelet. Autocorrelation of the recorded seismic data is obtained by convolving the convolution model in Equation (2) with each term in Equation (2), which cancels cross-correlation terms because noise and reflectivity are independent, leaving only autocorrelation of the seismic trace related to autocorrelation of the source wavelet:

$$C_d^2(\tau) = C_r^2(\tau) * C_w^2(\tau) + C_\epsilon^2(\tau) \quad (3)$$

$$= a_r^2 \delta(\tau) * C_w^2(\tau) + a_\epsilon^2 \delta(\tau)$$

$$= a_r^2 \left( C_w^2(\tau) + \frac{a_\epsilon^2}{a_r^2} \right)$$

where $$C_d^2(\tau) = \sum_t d(t)d(t-\tau)$$

$$C_r^2(\tau) = \sum_t r(t)r(t-\tau)$$

$$C_w^2(\tau) = \sum_t w(t)w(t-\tau)$$

$$C_\epsilon^2(\tau) = \sum_t \epsilon(t)\epsilon(t-\tau)$$

and $\tau$ is a lag time. Note that when $a_\epsilon/a_r \ll 1$, the signal-to-noise ratio is good and $C_d^2(\tau) \approx a_r^2 C_w^2(\tau)$. The autocorrections $C_d^2(\tau)$, $C_r^2(\tau)$, $C_w^2(\tau)$ and $C_\epsilon^2(\tau)$ are "second-order cumulants" of the seismic trace, reflectivity, source wavefield, and the noise, respectively. In Equation (3), a white reflectivity assumption reduces the reflectivity cumulant to $C_r^2(\tau) \approx a_r^2 \delta(\tau)$, where $a_r^2$ is a constant that represents the energy of the reflectivity (signal) and $\delta(\tau)$ is the delta function with $\delta(\tau)=1$ for $\tau=0$ and $\delta(\tau)=0$ for $\tau \neq 0$. Similarly, a white noise assumption reduces autocorrelation of the noise to $C_\epsilon^2(\tau) = a_\epsilon^2 \delta(\tau)$, where $a_\epsilon^2$ is a constant that represents the energy of the noise. Both parametric spiking deconvolution 601 and non-parametric homomorphic deconvolution 602 use the spectrum of the seismic cumulant to obtain the amplitude spectrum of the seismic data in the following relation:

$$C_d^2(f) = 1DFFT\{C_d^2(\tau)\} = W(f)W(f)^* = |W(f)|^2 \quad (4)$$

where
1DFFT represents a one-dimensional discrete fast Fourier transform; and
W(f) is the source wavelet in the frequency domain.

However, transformation of the seismic trace cumulant $C_d^2(t)$ from the time domain to the frequency domain in Equation (4) discards phase information associated with the actual source wavelet used to record the seismic data. As a result, an assumption on the phase, such as a zero phase or a minimum phase, is applied to the estimated source wavelet, which reduces accuracy of the estimated source wavelet to the actual source wavelet produced in the seismic survey.

In FIG. 6B, higher-order statistics methods for wavelet estimation are divided into time domain methods, such as cumulant matching methods 603, and frequency domain methods that depend on polyspectra of the data 604. For higher-order statistics for wavelet estimation, the results obtained in Equation (3) using the autocorrelation are generalized to higher order cumulants. Consider, for example, third-order cumulants derived from the convolutional model in Equation (2). Third-order cumulant of the recorded seismic data is obtained by convolving Equation (3) with each of the terms in Equation (2) for two time lags, which cancels cross-correlation terms because the noise is independent of the reflectivity, leaving the third-order cumulant of the seismic trace related to the third-order cumulant of the source wavelet and that of the noise as:

$$C_d^3(\tau_1, \tau_2) = C_r^3(\tau_1, \tau_2) * C_w^3(\tau_1, \tau_2) + C_\epsilon^3(\tau_1, \tau_2) \quad (5)$$

$$= a_r^3 \delta(\tau_1)\delta(\tau_2) * C_w^3(\tau_1, \tau_2) + a_\epsilon^2 \delta(\tau_1)\delta(\tau_2)$$

$$= a_r^3 C_w^3(\tau_1, \tau_2)$$

where $$C_d^3(\tau_1, \tau_2) = \sum_t d(t)d(t-\tau_1)d(t-\tau_2)$$

$$C_r^3(\tau_1, \tau_2) = \sum_t r(t)r(t-\tau_1)r(t-\tau_2)$$

$$C_w^3(\tau_1, \tau_2) = \sum_t w(t)w(t-\tau_1)w(t-\tau_2)$$

$$C_\epsilon^3(\tau_1, \tau_2) = \sum_t \epsilon(t)\epsilon(t-\tau_1)\epsilon(t-\tau_2)$$

and $\tau_1$ and $\tau_2$ are lag times. The parameters $C_d^3(\tau_1, \tau_2)$, $C_r^3(\tau_1, \tau_2)$, $C_w^3(\tau_1, \tau_2)$ and $C_\epsilon^3(\tau_1, \tau_2)$ are "third-order cumulants" of the seismic trace, reflectivity, source wavefield and the noise, respectively. The white reflectivity assumption again results in $C_r^3(\tau_1, \tau_2) = a_r^3 \delta(\tau_1)\delta(\tau_2)$. The assumption that the noise is white and Gaussian or more generally white with a symmetric probability distribution function ("PDF") results in $C_\epsilon^3(\tau_1, \tau_2) = 0$. In FIG. 6B, cumulant matching 603 estimates a source wavelet that minimizes the cumulant of the seismic trace. For example, minimization of a third order seismic trace cumulant may be obtained by minimizing a loss function:

$$\min_w \sum_{\tau_1} \sum_{\tau_2} \left( C_d^3(\tau_1, \tau_2) - \sum_t w(t)w(t-\tau_1)w(t-\tau_2) \right)^2 \quad (6)$$

The loss function in Equation (6) is non-linear and non-convex. Minimization of Equation (6) gives an estimated source wavelet. On the other hand, polyspectra methods 604 give polyspectrum by transforming the higher-order source wavelet from the time domain to the frequency domain. For example, a two-dimensional Fourier transform of Equation (5) gives a source wavefield polyspectrum:

$$C_d^3(f_1,f_2) = 2\text{DFFT}\{C_d^3(\tau_1,\tau_2)\} = W(f_1)W(f_2)\overline{W(f_1+f_2)} \quad (7)$$

where the overbar represents the complex conjugate. The seismic trace cumulant and the wavelet in the frequency domain can be rewritten in polar form as follows:

$$C_d^3(f_1,f_2) = |C_d^3(f_1,f_2)| e^{j\psi_d(f_1,f_2)} \quad (8a)$$

$$W(f) = |W(f)| e^{jw(f)} \quad (8b)$$

where $\psi_d(f_1, f_2)$ is the phase of the seismic trace; and $w(f)$ is the phase of the source wavelet.

Taking the log of the polyspectrum in Equation (7) demonstrates that the amplitude and phase and the source wavelet are related to the amplitude and phase of the polyspectrum as follows:

$$\log(|C_{wd}^3(f_1,f_2)|) = \log(|W(f_1)|) + \log(|W(f_2)|) + \log(|W(f_1+f_2)|) \quad (8c)$$

$$\psi_d(f_1,f_2) = \omega(f_1) + \omega(f_2) - \omega(f_1+f_2) \quad (8d)$$

Unlike the frequency representation of the second-order cumulant (i.e., autocorrelation) in Equation (4), the frequency representation of higher order cumulants preserve phase information of the source wavelet in Equations (8a)-(8d). Equation (8d) is a linear system of equations that can be solved using least-squares. Polyspectra methods 604, such as phase unwrapping 605, may be used to determine the phase when the phase of the source wavelet is unbounded. Alternatively, parametric modeling 606, such as autoregressive-moving average ("ARMA") modeling, of a complex spectrum of a source wavelet may be used to obtain the polyspectrum. However, phase unwrapping 605 is challenging to implement, particularly for two- and higher-dimensional complex signals and the process is unstable when data is non-stationary, as is the case with seismic data. Parametric modeling 606 is robust for short wavelet lengths, which is not suitable for most seismic applications where the source wavelet length is large.

Processes and System for Estimating a Source Wavelet

Processes and systems described herein are directed to estimating a source wavefield from seismic data. Processes and systems include using the estimated source wavefield to determine properties of a subterranean formation, including performing quality control ("QC"), designature the recorded seismic data, perform phase correction of the PTSM images, obtain impedance models that are used in quantitative interpretation of oil and gas reservoirs, and perform full-waveform inversion ("FWI") to obtain accurate high-resolution velocity models of the subterranean formation that in turn may be used to determine properties of the subterranean formation (e.g., composition) and generate images of the subterranean formation.

FIGS. 7A-7E are flow diagrams of methods for determining properties of a subterranean formation and exhibit different ways in which an estimated source wavelet may be incorporated into processes that determined properties of a subterranean formation. The properties of the subterranean formation are revealed in PSTM images, velocity models, and impedance models of the subterranean formation. The PSTM images show complex geological structures and interfaces within the subterranean formation that may contain oil and natural gas. Velocity models and/or impedance models may be used in conjunction with seismic images to reveal the composition and lithology of complex geological structures and layers of a subterranean formation. For example, oil and natural gas reservoirs are typically found in layers of sandstone, clastic rocks, and carbonates, such as limestones. These layers have associated seismic velocities and impedances that are revealed in the velocity and impedance models. Geoscientists in the oil and gas industry carefully examine images, velocity models, and/or impedance models of a subterranean formation to identify rock interfaces or layers that potentially contain oil and natural gas reservoirs. Without accurate seismic images, velocity models and/or impedance models of a subterranean formations, geoscientists would have to resort to randomly drilling test wells in the hopes of finding a reservoir of oil and natural gas.

Figure 7A:
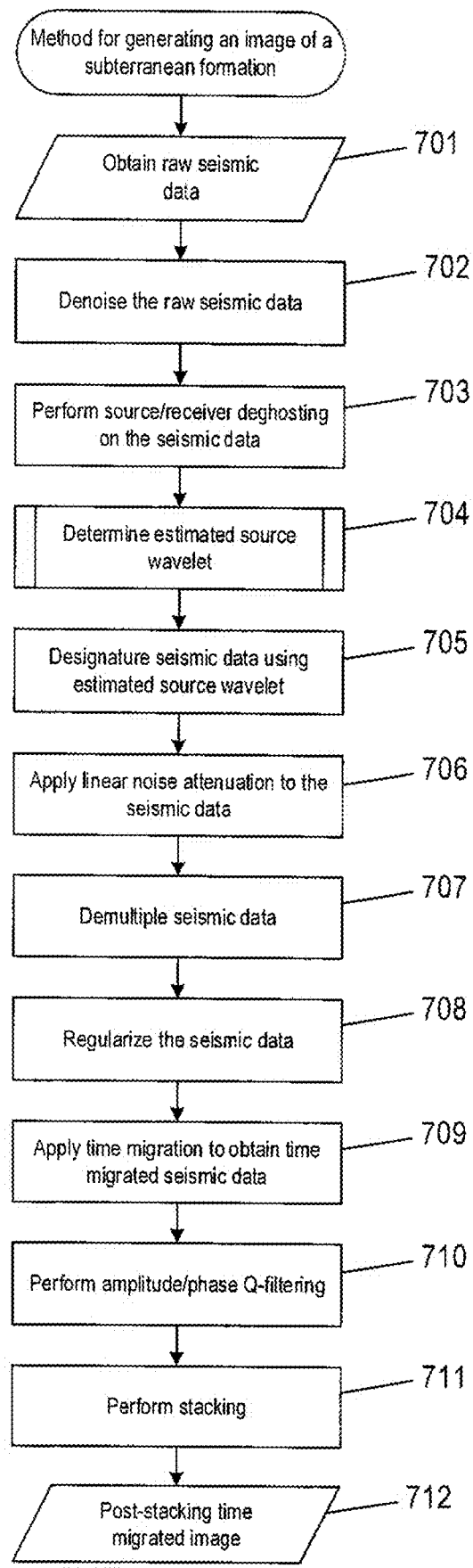
FIGS. 7A-7E are flow diagrams of methods for determining properties of a subterranean formation.

FIG. 7A is a flow diagram of a method for generating an image of a subterranean formation in which an estimated source wavefield is used to designature seismic data. In block 701, raw seismic data is obtained from one or more data storage devices. The raw seismic data may have been recorded in a marine seismic survey or in a land-based seismic survey. For example, the recorded seismic data may be a shot gather, common-receiver gather, or a common-midpoint gather. In block 702, the raw seismic data is denoised to remove incoherent or random noise. In block 703, source/receiver deghosting is performed to separate the seismic data into upgoing and downgoing wavefield components. The downgoing wavefields record source ghosts created by acoustic reflections from the free surface. The operations represented below are performed on the upgoing seismic data (i.e., deghosted seismic data). In block 704, a "determine estimated source wavelet" procedure is performed on the deghosted seismic data. An example implementation of the "determine estimated source wavelet" procedure is performed in FIG. 10. In block 705, the deghosted seismic data is designatured using the estimated source wavelet obtained in block 704. In block 706, linear noise attenuation may be performed by modeling linear noise in the seismic data and subtracting the linear noise model from the seismic data. In block 707, multiple reflections are attenuated in the seismic data output from block 706. The resulting seismic data represents the primary wavefields reflected upward from the subterranean formation. In block 708, regularization and interpolation are applied to the seismic data. Because the receivers move during seismic data recording, the receiver coordinates of the seismic traces of are not regularly spaced during recording of the seismic data. Regularization corrects irregularly spaced receiver coordinates of the traces to regularly spaced grid points. Interpolation replaces corrupted traces or fills in missing seismic traces, such as creating traces of seismic data in the crossline direction. In block 709, migration is applied to the seismic data in the space-time coordinate system to obtain time migrated seismic data (i.e., image of the subterranean formation). Time migration techniques use a velocity model to re-locate reflection events recorded in the seismic data in time, thereby the resulting images accurately represent dips and orientations of interfaces within the subterranean formation. In block 710, amplitude and phase Q filtering are performed to enhance resolution of the image obtained in block 709. In block 711, stacking is applied to the time migrated image to obtain a PTSM image 712.

Figure 7B:
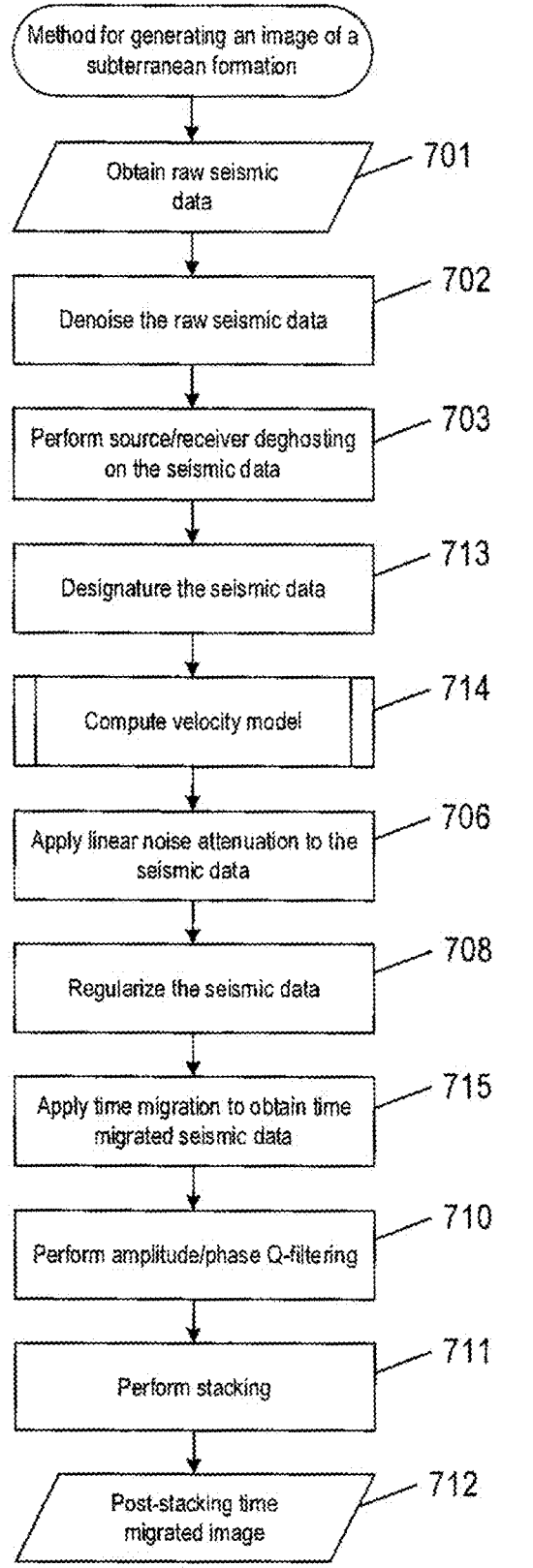

FIG. 7B is a flow diagram of a method for generating an image of a subterranean formation and generating an estimated source wavefield that is used to enhance a velocity model of the subterranean formation. Blocks 701-703, 706, 708, are 710-712 represent the same operations performed in FIG. 7A. In block 713, the deghosted seismic data output from block 703 is designatured using a model of the source wavefield. For example, the model of the source wavefield may have been obtained from near field signature measured with pressure sensors located next to each air gun of the source 104 or from a pressure measurement recorded in the far field of the source 104. In block 714, a "compute velocity model" procedure is performed. An example implementation of the "compute velocity model" procedure is performed in FIG. 7C. In block 715, migration is applied to the seismic data in the space-time coordinate system to obtain time migrated seismic data. The migration may be performed using the velocity model generated in block 714. The resulting PTSM image 712 in combination with the velocity model obtained in block 714 may be used to determine properties of the subterranean formation, such as identification of layers that contain oil and natural gas deposits.

Figure 7C:
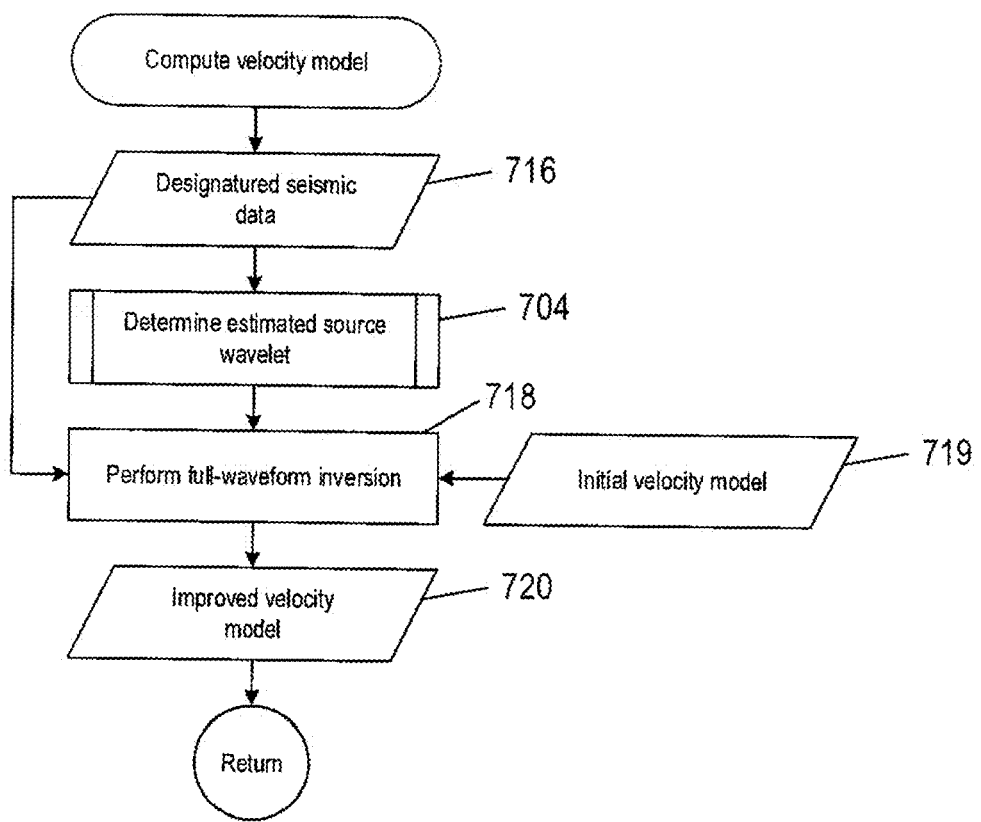

FIG. 7C is a flow diagram of "compute velocity model" procedure performed in block 714 of FIG. 7B. In block 704, the "determine estimated source wavefield" procedure is performed using the designatured seismic data 716 output from block 713 in FIG. 7B. In block 718, full-waveform inversion is performed using the estimated source wavelet output from block 704 and an initial velocity model 719 to obtain an improved resolution velocity model 720. The velocity model 720 may be used in block 715 to perform time migration. The velocity model 720 is used to identify rock interfaces or layers that potentially contain oil and natural gas reservoirs in the PTSM image 712.

Figure 7D:
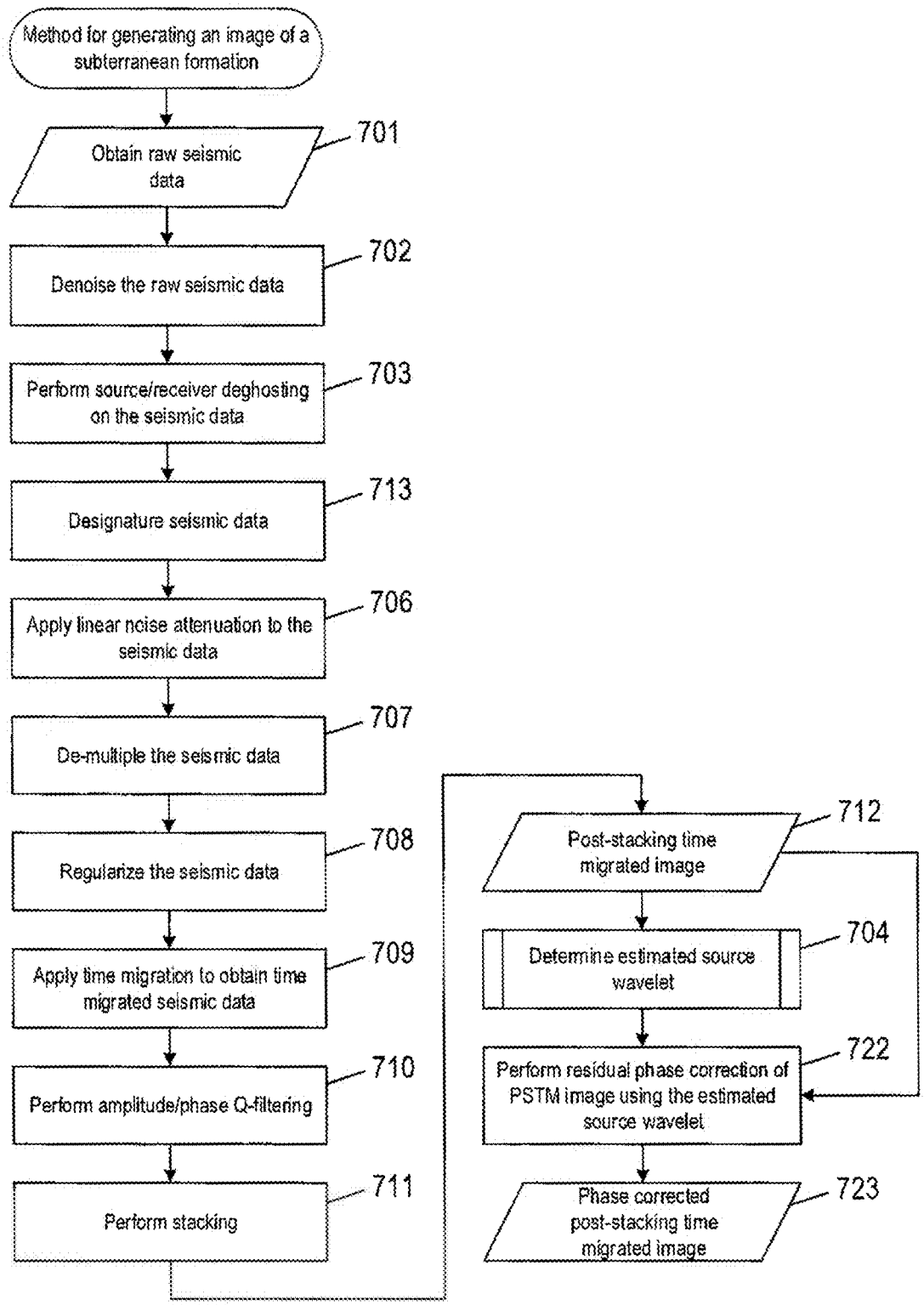

FIG. 7D is a flow diagram of a method for generating a PSTM image of a subterranean formation in which an estimated source wavefield is used to enhance resolution of the PSTM image. Blocks 701-703, 706-712, and 713 represent the same operations performed in FIGS. 7A and 7B. In block 704, the "determine estimated source wavefield" procedure is performed on the PSTM image 712. In block 722, residual phase correction is performed on the PSTM image using the estimated source wavelet to generate a phase corrected PSTM image, thereby reducing phase contamination.

Figure 7E:
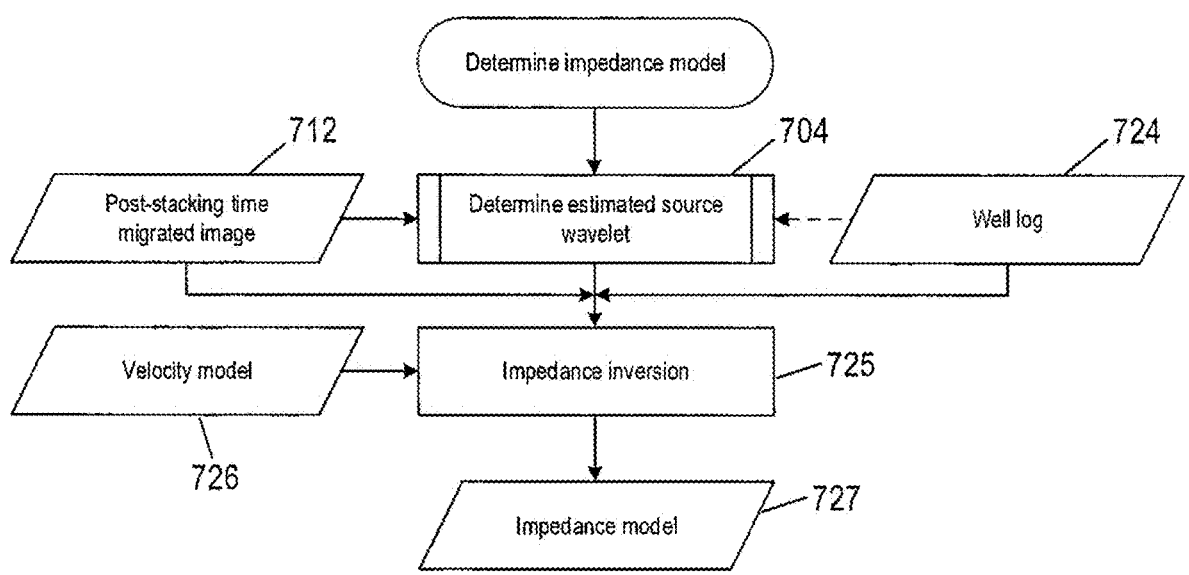

FIG. 7E is a flow diagram of a method determining an impedance model of a subterranean formation. In block 704, the "determine estimated source wavefield" procedure is performed on the PSTM image 712 and may include a well log 724. A well log is a detailed record of the lithology of the geologic formations penetrated in a borehole. The well log may be determined by visual inspection of earth samples brought to the surface while drilling a well or determined from physical measurements made by instruments lowered into a borehole. Geophysical well logs are often obtained during drilling or oil and gas production. A well tie involves running a seismic line by a well so that seismic events can be correlated with well log information. In block 725, impedance inversion is performed using a velocity model 726, the estimated source wavelet output from block 704, the PSTM image, and the well log 724 to obtain an impedance model of a subterranean formation. The impedance model may be used to identify rock interfaces or layers in the PSTM image 712 or another image of the subterranean formation that potentially contain an oil and/or natural gas reservoir.

Processes and systems for estimating a source wavelet in block 704 of FIGS. 7A-7E are based on a source wavelet that is a convolutional model of a base wavelet, denoted by $w_0(t)$, and a time-constrained phase-only wavelet, denoted by $h(t)$:

$$w(t)=w_0(t)*h(t) \qquad (9)$$

where $$h(t)=0 \text{ for } |t|>T (T \text{ is a time gap}); \text{ and}$$

$$|H(f)|=1.$$

The estimated source wavelet $w(t)$ is a mixed-phase source wavelet that combines phase contributions from the base wavelet $w_0(t)$ and the time constrained phase-only wavelet $h(t)$. The time-constrained phase only wavelet $h(t)$ is limited to the time gap T. The amplitude spectrum of the phase-only wavelet is equal to one, i.e. $|H(f)|=1$. The base wavelet $w_0(t)$ may be a minimum-phase wavelet when the seismic data used to extract the source wavelet has not been designatured. The base wavelet may be a zero-phase wavelet when the seismic data used to extract the source wavelet has been designatured. The base wavelet is determined from the seismic data. For example, the base wavelet may be determined from a stack along a target horizon or a modelled source wavelet. The time gap, T, is a user supplied parameter that controls a desired amount of phase deviation the base wavelet $w_0(t)$ will have from the source wavelet $w(t)$. The larger the time gap T, the farther the source wavelet $w(t)$ is from the base wavelet $w_0(t)$. When the base wavelet is a minimum-phase wavelet, the estimated source wavelet combines, or mixes, phase contributions from the minimum-phase wavelet and the phase-only wavelet. When the base wavelet is a zero-phase wavelet, the phase of the estimated source wavelet is the phase of the phase-only wavelet.

The following discussion with reference to Equations (10)-(34) provides a framework for determining an estimated source wavelet from recorded seismic data. Examples of processing steps for computing an estimated source wavelet introduced in block 704 of FIGS. 7A-7E based on the discussion of Equations (10)-(14) are described below with reference to FIGS. 10-14.

Processes for computing an estimated source wavelet begin by computing a base wavelet from the recorded seismic data. Alternatively, the base wavelet may be supplied as input by the user. Next, a cumulant of the phase-only wavelet is obtained by deconvolving the cumulant of the base wavelet $w_0(t)$ from the cumulant of the seismic data in the frequency domain. The phase-only wavelet is iteratively computed from a previously estimated cumulant of the seismic data and further processed to satisfy the constraint $h(t)=0$ for $|t|>T$. The time-constrained phase only wavelet is convolved with the base wavelet to obtain the estimated source wavelet in Equation (9).

Computing the Base Wavelet

The base wavelet is determined based on a set of N seismic traces $\{d_n(t)\}_{n=1}^N$. The seismic traces have been deghosted, may have been designatured, or may comprise traces of a PSTM image as described with reference to FIGS. 7A-7E. The set of seismic traces $\{d_n(t)\}_{n=1}^N$ may be in any domain. For example, the set of N seismic traces may be seismic traces in the common shot domain, the common-receiver domain, or the common-midpoint domain.

Figure 8A:
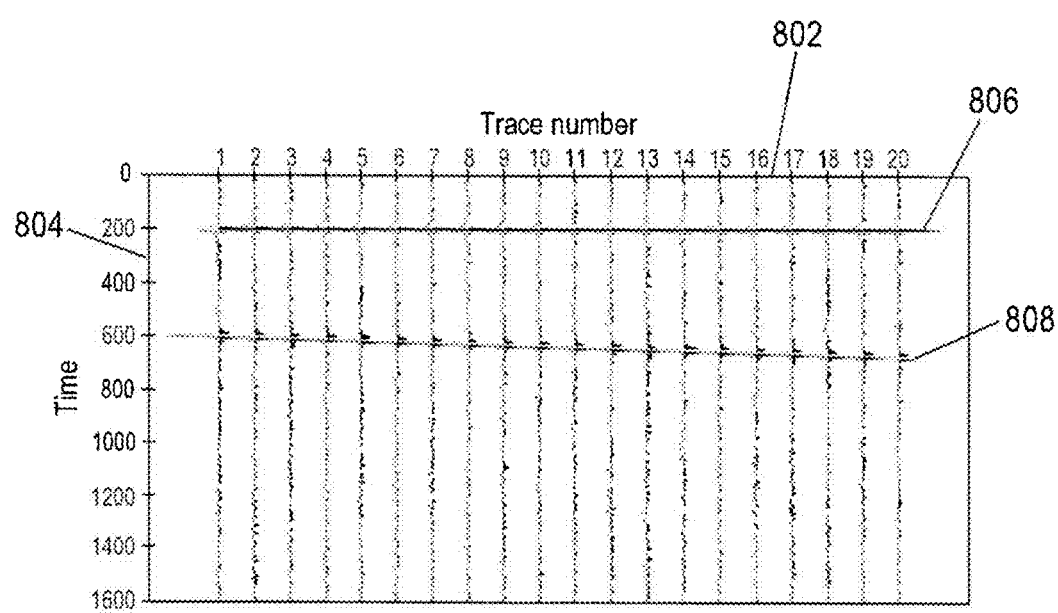
FIGS. 8A-8E show determining a zero-phase wavelet and a minimum-phase base wavelet from a set of seismic traces.

FIG. 8A shows an example synthetic gather of twenty (i.e., N=20) seismic traces. Horizontal axis 802 represents trace, or channel, numbers. Vertical axis 804 represents time. Each trace records reflection events, such as reflection events 806 and 808, and random noise represented by minor amplitude fluctuations in each trace. The gather may represent seismic traces in the common shot domain, the common-receiver domain, or the common-midpoint domain.

Each seismic trace in the set of N seismic traces $\{d_n(t)\}_{n=1}^{N}$ is transformed from the time domain to the frequency domain using a discrete fast Fourier transform ("DFFT") to obtain a spectrum for the seismic trace. The set of N spectra is denoted by $\{D_n(f)\}_{n=1}^{N}$. The log of the amplitude spectrum, denoted by $\log|D_n(f)|$, is computed for each spectrum in the set of N spectra, where |·| is the modulus and log represents the natural logarithm. The N log-spectra are averaged over the range of frequencies to obtain an average log spectrum given by:

$$\hat{W}_L(f) = \frac{1}{N}\sum_{n=1}^{N}\log|D_n(f)| \tag{10}$$

Figure 8B:
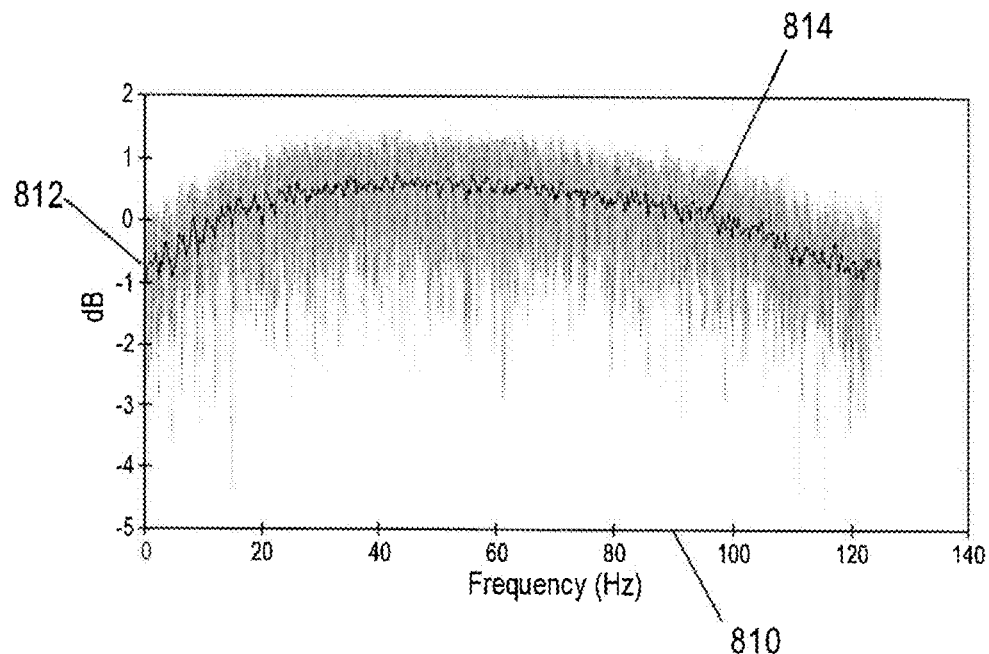

FIG. 8B shows 20 overlapping log-spectra computed for each of the 20 seismic traces shown in FIG. 8A. Horizontal axis 810 represents a range of frequencies. Vertical axis 812 represents decibels. Wildly oscillating and overlapping curves are the 20 log-spectra over a frequency range from 0 Hz to about 125 Hz. Jagged curve 814 represents the average log-spectrum computed for the 20-individual log-spectra at each frequency according to Equation (10).

The average log-spectrum is smoothed using data smoothing to obtain a smooth log-spectrum denoted by $\hat{W}_{SL}(f)$. For example, a smooth log-spectrum may be computed using a moving average over a range of frequencies:

$$\hat{W}_{SL}(f_j) = \frac{1}{\sum_{i=1-m}^{m-1}\alpha_i}\sum_{i=1-m}^{m-1}\alpha_i \hat{W}_L(f_{(j-i)}) \tag{11}$$

where $f_j$ is the j-th frequency;

m is the number of frequency samples used in the filtering and known as filter length values; and $\{a_i\}_{i=1-m}^{m-1}$ is a set of filtering weights (e.g., boxcar or triangle)

Figure 8C:
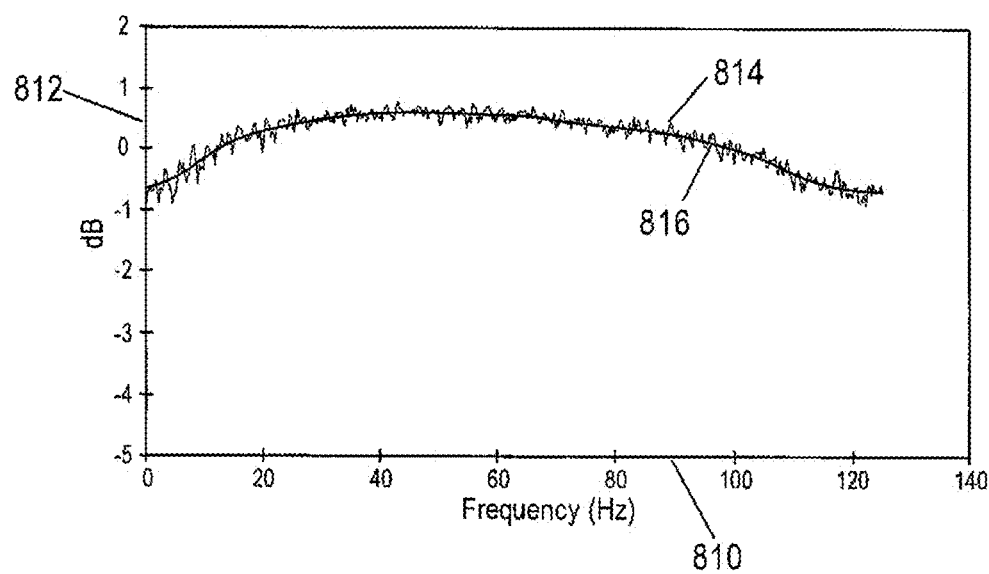

FIG. 8C shows an example smooth log-spectrum 816 of the average log-spectrum 814.

The base wavelet is determined based on the smooth log-spectrum obtained in Equation (11) and on the option to obtain a zero-phase wavelet or minimum-phase wavelet. Suppose the set of seismic traces have not been designatured or a user wants to use a minimum phase wavelet as a base wavelet. The exponential of the smooth log-spectrum in Equation (11) gives the Fourier transform or spectrum of the zero-phase wavelet as follows:

$$W_{zero}(f) = \exp(\hat{W}_{SL}(f)) \tag{12}$$

The spectrum of the zero-phase wavelet $W_{zero}(f)$ is transformed from the frequency domain using an inverse DFFT ("IDFFT") to obtain a zero-phase wavelet $w_{zero}(t)$ in the time domain.

Figure 8D:
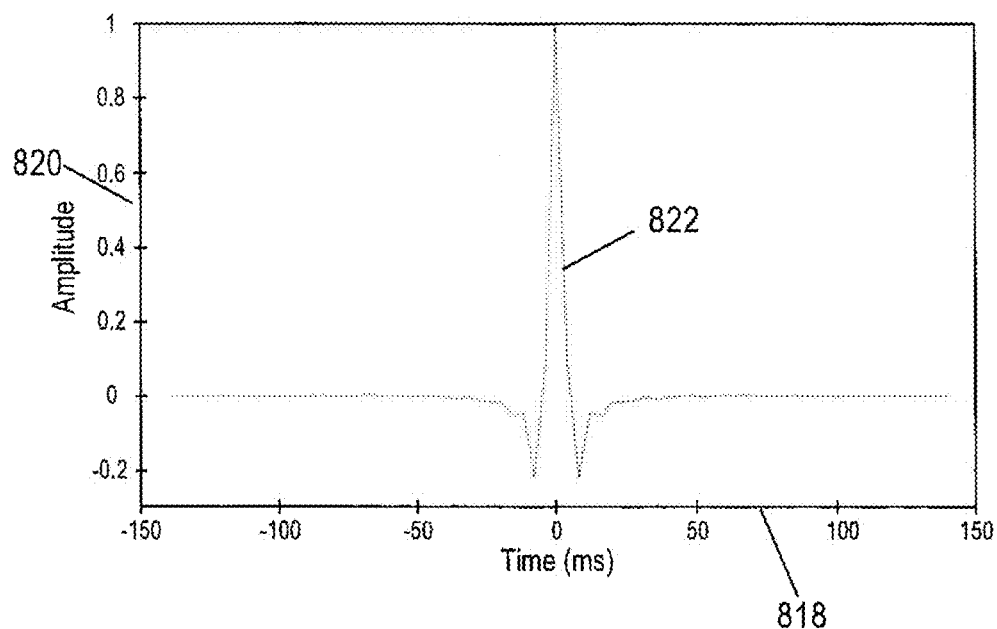

FIG. 8D shows an example plot of a zero-phase wavelet centered at time zero. Horizontal axis 818 represents time. Vertical axis 820 represents a range of amplitudes. Curve 822 represents the zero-phase wavelet.

On other hand, suppose the set of seismic traces have not been designatured or a user wants to use a minimum phase wavelet as a base wavelet. In this case, the smooth log-spectrum $\hat{W}_{SL}(f)$ is transformed from the frequency domain using an IDFFT to obtain a smooth wavelet which is known as the cepstrum $\hat{W}_{cep}(t)$. A causal part of the cepstrum is determined by zeroing the values for time less than zero as follows:

$$\hat{w}_+(t) = \begin{cases} \hat{w}_{cep}(t) & \text{for } t \geq 0 \\ 0 & \text{for } t < 0 \end{cases} \tag{13}$$

The causal wavelet $\hat{W}+(t)$ is transformed from the time domain back to the frequency domain $\hat{W}+(f)$ using a fast Fourier transform ("FFT"). The exponential of the Fourier transform $\hat{W}+(f)$ gives the spectrum of the minimum-phase wavelet;

$$W_{min}(f) = \exp(\hat{W}+(f)) \tag{14}$$

The spectrum of the minimum-phase wavelet $W_{min}(f)$ is transformed from the frequency domain using an IDFFT to obtain a minimum-phase wavelet $w_{min}(t)$ in the time domain.

Figure 8E:
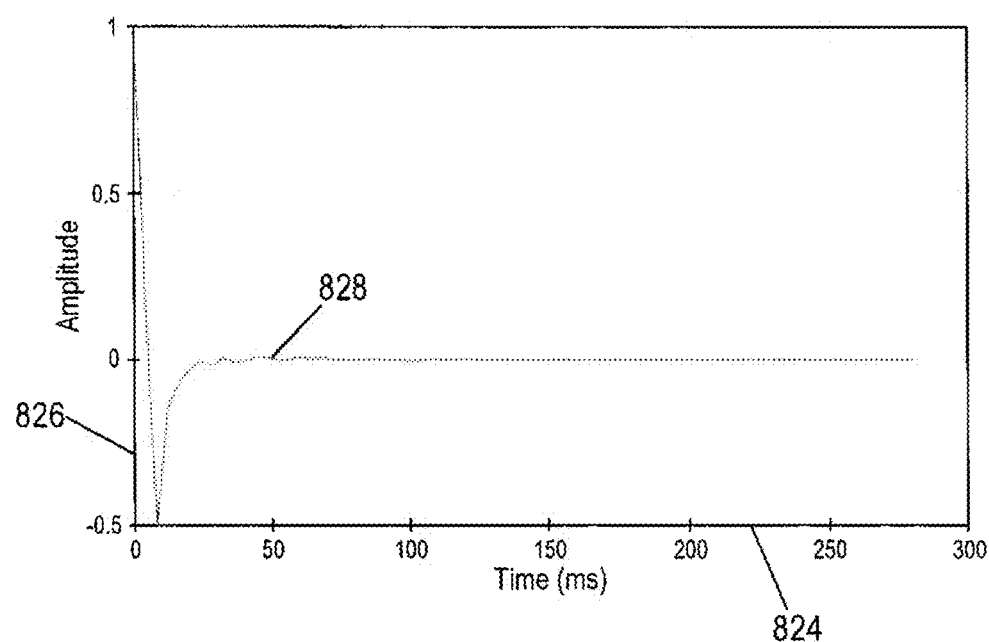

FIG. 8E shows an example plot of a minimum-phase wavelet. Horizontal axis 824 represents time. Vertical axis 826 represents a range of amplitudes. Curve 828 represents the minimum-phase wavelet.

The base wavelet denoted by $w_0(t)$ in Equation (9) is the zero-phase wavelet $w_{zero}(t)$ when the recorded seismic data has been designatured. Alternatively, the base wavelet denoted by $w_0(t)$ in Equation (9) is the minimum-phase wavelet $w_{min}(t)$ when the recorded seismic data has not been designatured.

Deconvolving Cumulant of the Base Wavelet from Cumulants of Seismic Traces

A third-order base wavelet cumulant is computed for the base wavelet as follows:

$$C_{w_0}^3(\tau_1, \tau_2) = \sum_t w_0(t)w_0(t-\tau_1)w_0(t-\tau_2) \tag{15}$$

where $\tau_1$ and $\tau_2$ are time lags.

The base wavelet cumulant $C_{w_0}^3(\tau_1, \tau_2)$ is transformed from the time domain to the frequency domain using a two-dimensional discrete fast Fourier transform ("2DFFT") to obtain a polyspectrum of the base wavelet cumulant denoted by $C_{w_0}^3(f_1, f_2)$, where $f_1$ and $f_2$ are frequency lags in the frequency domain that correspond to the time lags $\tau_1$ and $\tau_2$. Note that higher-order cumulants are transformed with corresponding higher-order DFFTs.

A seismic trace cumulant is computed for each seismic trace in the set of N seismic traces $\{d_n(t)\}_{n=1}^{N}$ as follows:

$$C_{d_n}^3(\tau_1, \tau_2) = \sum_t d_n(t)d_n(t-\tau_1)d_n(t-\tau_2) \tag{16}$$

An aggregate cumulant is computed from the N seismic trace cumulants. In one implementation, an aggregate cumulant is computed by stacking the N seismic trace cumulants as follows:

$$C_{stack}^3(\tau_1, \tau_2) = \frac{1}{N}\sum_{n=1}^{N} C_{d_n}^3(\tau_1, \tau_2) \tag{17a}$$

In another implementation, an aggregate cumulant is the median of the N seismic trace cumulants:

$$C_{stack}^3(\tau_1,\tau_2)=\text{median}\{C_{d_n}^3(\tau_1,\tau_2)\}_{n=1}^N \tag{17b}$$

In still another implementation, an aggregate cumulant is computed by weighted stacking of the N seismic trace cumulants:

$$C_{stack}^3(\tau_1, \tau_2) = \frac{1}{M}\sum_{n=1}^{N} w_n C_{d_n}^3(\tau_1, \tau_2) \tag{17c}$$

where $w_n$ is a weight of the n-th trace of the N seismic trace cumulants; and $$M = \sum_{n=1}^{N} w_n$$

The aggregate cumulant is transformed from the time domain to the frequency domain using a 2DFFT to obtain a polyspectrum of the aggregate cumulant denoted by $C_{stack}^3(f_1, f_2)$.

The polyspectrum of the phase-only wavelet cumulant is computed based on the polyspectrum of the base wavelet $C_{w_0}^3(f_1, f_2)$ and the polyspectrum of the aggregate cumulant $C_{stack}^3(f_1, f_2)$ as follows:

$$C_h^3(f_1, f_2) = \frac{C_{stack}^3(f_1, f_2)\overline{C_{w_0}^3(f_1, f_2)}}{|C_{w_0}^3(f_1, f_2)|^2 + \epsilon} \tag{18}$$

where the overbar represents the complex conjugate operation.

The polyspectrum of the phase-only wavelet $C_h^3(f_1, f_2)$ given by Equation (19) is obtained by minimizing the least squares equation:

$$\min_{C_h^3(f_1, f_2)} \sum_{n=1}^{N} |C_{d_n}^3(f_1, f_2) - C_{w_0}^3(f_1, f_2)C_h^3(f_1, f_2)|^2 \tag{19}$$

where $C_{d_n}^3(f_1, f_2) - C_{w_0}^3(f_1, f_2)C_h^3(f_1, f_2)$ is the residual. The polyspectrum of the phase-only wavelet $C_h^3(f_1, f_2)$ is normalized to obtain the normalized polyspectrum of the phase-only wavelet given by $$\overline{C}_h^3(f_1, f_2) = \frac{C_h^3(f_1, f_2)}{|C_h^3(f_1, f_2)|} \tag{20}$$

The spectrum of the phase-only wavelet H(f) is related to the normalized polypectrum of the phase-only wavelet as follows:

$$\overline{C}_h^3(f_1,f_2)=H(f_1)H(f_2)\overline{H(f_1+f_2)} \tag{21}$$

where H(f) is the spectrum of the phase-only wavelet in the frequency domain.

Computing the Phase-Only Wavelet

The spectrum of the phase-only wavelet H(f) in Equation (21) is iteratively determined. In the following discussion, superscripts (k) are used as an iteration index, where k=0, 1, 2, . . . . The spectrum of the phase-only wavelet is initialized as follows:

$$H^{(0)}(f)=1 \tag{22}$$

The iterative process of determining the spectrum of the phase-only wavelet is performed for k=1, 2, 3, . . . . For each iteration, a partial polyspectrum of the phase-only wavelet is computed according to $$q^{(k)}(f_1,f_2)=H^{(k)}(f_2)\overline{H^{(k)}(f_1+f_2)} \tag{23}$$

An estimated un-normalized spectrum of the phase-only wavelet is computed at each iteration as follows:

$$A(f) = \frac{\sum_{f_2}\overline{C}_h^3(f, f_2)\overline{q^{(k)}(f, f_2)}}{\sum_{f_2}|q^{(k)}(f, f_2)|^2} \tag{24}$$

The estimated un-normalized spectrum of the phase-only wavelet A(f) in Equation (24) minimizes the least squares equation given by $$\min_{A(f)}\sum_{f_2}|\overline{C}_h^3(f, f_2) - A(f)q^{(k)}(f, f_2)|^2 \tag{25}$$

where $\overline{C}_h^3(f, f_2)-A(f)q^{(k)}(f, f_2)$ is the residual.

The spectrum of the phase-only wavelet is updated at each iteration by normalizing the estimated un-normalized spectrum of the phase-only wavelet as follows:

$$H^{(k+1)}(f) = \frac{A(f)}{|A(f)|} \tag{26}$$

The iterative process for determining the spectrum of the phase-only wavelet stops when the following condition is satisfied:

$$|H^{(k+1)}(f)-H^{(k)}(f)|<\varepsilon \tag{27}$$

where $\varepsilon$ is a user selected constant that controls convergence of the iterative process. For example, a user may select $\varepsilon$ equal to 0.1, 0.01, or 0.001.

Let $H^{(K)}(f)$ represent the spectrum of the phase-only wavelet that satisfies the condition in Equation (27) after K iterations. A wavelet obtained from simply transforming the spectrum of the phase-only wavelet $H^{(K)}(f)$ to the time domain would not satisfy the time constraints given in Equation (9). Processes include iteratively performing phase conditioning on the spectrum of the phase-only wavelet $H^{(K)}(f)$ to obtain the phase-only wavelet that satisfies the conditions in Equation (9). In the following discussion, subscripts (j) are an iteration index, where j=0, 1, 2, . . . . Phase conditioning begins by using the spectrum of the phase-only wavelet $H^{(K)}(f)$ to initialize a phase conditioned spectrum of the phase-only wavelet as follows:

$$H_{(0)}(f)=H^{(K)}(f) \tag{28}$$

For each iteration, the phase conditioned spectrum $H_{(j)}(f)$ is transformed from the frequency domain to the time domain to obtain a phase conditioned phase-only wavelet $h_{(j)}(t)$. Values of the phase conditioned phase-only wavelet with times located outside the time gap are zeroed by setting $h_{(j)}(t)=0$ for $|t|>T$. A phase conditioned phase-only wavelet $h_{(j)}(t)$ where $|t| \leq T$ is transformed from the time domain to the frequency domain to obtain the phase conditioned spectrum of the phase-only wavelet denoted by $H'_{(j)}(f)$, where the prime represents phase conditioned. The phase conditioned spectrum is updated by normalizing the phase conditioned spectrum $H'_{(j)}(f)$ as follows:

$$H_{(j+1)}(f) = \frac{H'_{(j)}(f)}{|H'_{(j)}(f)|} \quad (29)$$

The iterative process for phase conditioning the spectrum of the phase-only wavelet stops when the following condition is satisfied:

$$|H_{(j+1)}(f)-H_{(j)}(f)|<\delta \quad (30)$$

where $\delta$ is a user selected constant to determine convergence of the iterative process. For example, a user may select $\delta$ equal to 0.1, 0.01, or 0.001. The iterative process of phase conditioning enforces the time constraint that the phase only wavelet is zero for $|t|>T$ and may also remove impurities in the phase only wavelet $H^{(K)}(f)$.

Let $H_{(j)}(f)$ represent the phase conditioned spectrum of the phase-only wavelet that satisfies the condition in Equation (30) after J iterations. The phase conditioned spectrum $H_{(j)}(f)$ is transformed from the frequency domain to the time domain to obtain a time-constrained phase-only wavelet $h(t)$, where $h(t)=0$ for $|t|>T$ and $|H(f)|=1$.

Figure 9:
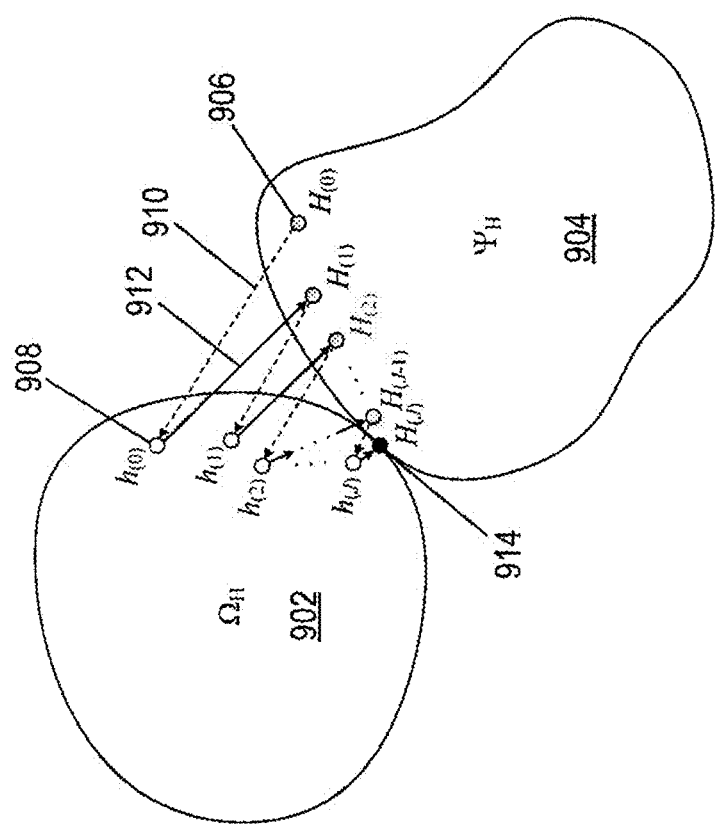
FIG. 9 shows an example of iterative projections that converge on a phase-only wavelet.

FIG. 9 shows an example of iterative projections that converge an unconstrainted phase-only wavelet $h(t)$ into a time-constrained phase only wavelet with the time constraint $h(t)=0$ for $|t|>T$. Shape 902 represents a set of all wavelets that are constrained in time as follows:

$$\Omega_h: h(t) | h(t) = 0 \text{ for } |t|>T \quad (31)$$

Shape 904 represents a set of phase-only wavelets with amplitude spectra given by $$\Psi_h: h(t) | |H(f)|=1 \quad (32)$$

where $H(f)=FFT\{h(t)\}$.

Shaded circles represent solutions that belong to the set $\Psi_h$. For example, shaded circle 906 represents the phase-only wavelet obtained from the deconvolution step which is used to initialize the phase conditioning process according to Equation (28). Open circles, such as open circle 908, represent $$h_{(j)}(t) = \begin{cases} 0 & \text{for } |t| > T \\ h_{(j)}(t) & \text{for } |t| \leq T \end{cases} \quad (33)$$

Dashed arrows, such as dashed arrow 910, represent transforming the phase conditioned spectrum of the phase-only wavelet from the frequency domain to the time domain and setting $h_{(j)}(t)=0$ for $|t|>T$. Solid arrows, such as solid arrow 912, represent transforming the phase-only wavelet from the time domain to the frequency domain. Solid circle 914 represents convergence of the iterative projections to a phase conditioned spectrum of the phase-only wavelet $H_{(j)}(f)$, where J represents the final iteration.

The time-constrained phase-only wavelet $h(t)$ is convolved with the base wavelet $w_0(t)$ to give the estimated source wavelet:

$$w(t)=w_0(t)*h(t) \quad (34)$$

The estimated source wavelet obtained in Equation (34) is a mixed-phase source wavelet that combines, or mixes, the phase contributions of the base wavelet and the time constrained phase-only wavelet.

Note that processes for determining an estimated source wavelet have been described above with reference to third-order cumulants. It should be noted that in practice, processes for determining an estimated source wavelet from recorded seismic data are not limited to third-order cumulants and may be performed with higher order cumulants, such as fourth, fifth, sixth and higher order cumulants without changing the operations described herein.

For example, the fourth-order cumulants of a seismic trace and the source wavelet are given by $$C_x^4(\tau_1, \tau_2, \tau_3) = \sum_t x(t)x(t-\tau_1)x(t-\tau_2)x(t-\tau_3) \quad (35)$$

where
$\tau_1, \tau_2$, and $\tau_3$ are time lags; and
$x(t)$ may be $d_n(t)$ or $w(t)$.

The polyspectrum of the fourth-order cumulant is obtained by applying a three-dimensional Fourier transform to the cumulant in Equation (35):

$$C_x^4(f_1, f_2, f_3)$$
$$=3DFFT\{C_x^4(\tau_1,\tau_2,\tau_3)\}=X(f_1)X(f_2)X(f_3)\overline{X(f_1+f_2+f_3)} \quad (36)$$

where
3DFFT represents a three-dimensional DFFT;
$f_1, f_2$, and $f_3$ are frequency lags that correspond to the time lags $\tau_1, \tau_2$, and $\tau_3$;
and
$X(f_i)$ may be $D_n(f_i)$ or $W(f_i)$ for i=1, 2, 3.

The deconvolution operation is performed with $$C_h^4(f_1, f_2, f_3) = \frac{1/N \sum_{n=1}^{N} C_{d_n}^4(f_1, f_2, f_3)\overline{C_{w_0}^4(f_1, f_2, , f_3)}}{|C_{w_0}^4(f_1, f_2, , f_3)|^2 + \epsilon} \quad (37)$$

The polyspectrum of the phase-only wavelet $C_h^4(f_1, f_2, f_3)$ is normalized to obtain the normalized polyspectrum of the phase-only wavelet given by $$\overline{C}_h^4(f_1, f_2, f_3) = \frac{C_h^4(f_1, f_2, f_3)}{|C_h^4(f_1, f_2, f_3)|} \quad (38)$$

The spectrum of the phase-only wavelet $H(f)$ is related to the normalized polypectrum of the phase-only wavelet as follows:

$$\overline{C}_h^4(f_1,f_2,f_3)=H(f_1)H(f_2)H(f_3)\overline{H(f_1+f_2+f_3)} \quad (39)$$

Figure 10:
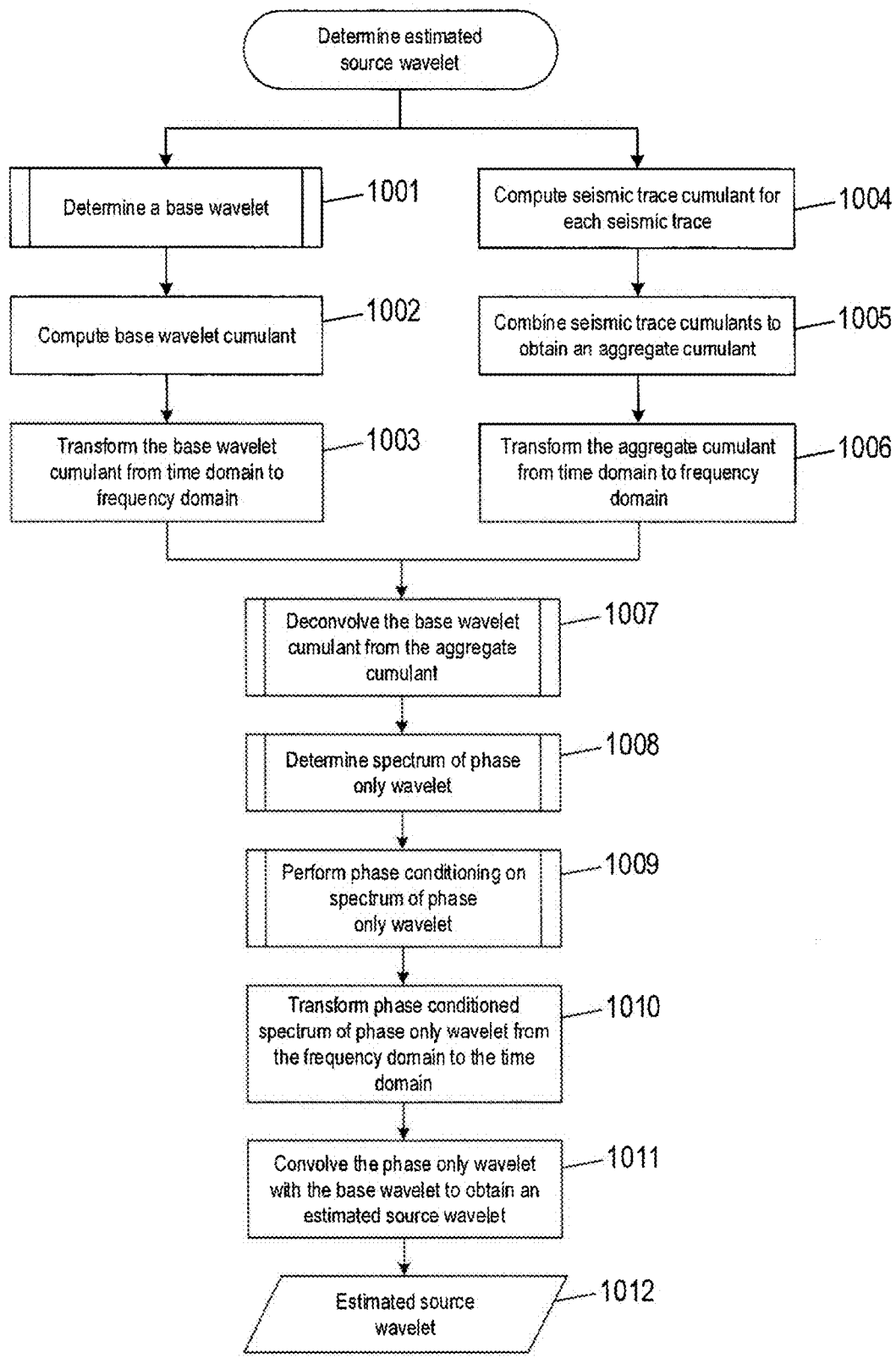
FIG. 10 is a flow diagram illustrating an example implementation of the "determine estimated source wavelet from recorded seismic data" procedure performed in FIG. 7.

FIG. 10 is a flow diagram illustrating an example implementation of the "determine estimated source wavelet from recorded seismic data" procedure performed in block 704 of FIGS. 7A-7E. In block 1001, an "determine a base wavelet" procedure is performed. An example implementation of the "determine a base wavelet" procedure is performed in FIG. 11 to obtain the base wavelet $w_0(t)$. The base wavelet may be a zero-phase wavelet if the recorded seismic data has been designatured. Alternatively, the base wavelet may be a minimum-phase wavelet if the recorded seismic data has not been designatured. In block 1002, a base wavelet cumulant is computed as described above with reference to Equation (15). In block 1003, the base wavelet cumulant is transformed from the time domain to the frequency domain to obtain a polyspectrum of the base wavelet cumulant. In block 1004, a seismic trace cumulant is computed for each seismic trace in the set of N seismic traces $\{d_n(t)\}_{n=1}^N$ as described above with reference to Equation (11). In block 1005, the N seismic trace cumulants obtained in block 1004 are combined to obtain an aggregate cumulant of the seismic trace cumulants as described above with reference to Equations (17a-17c). In block 1006, the aggregate cumulant obtained in block 1005 is transformed from the time domain to the frequency domain to obtain polyspectrum of the aggregate cumulant. In block 1007, a "deconvolve the base wavelet cumulant from the aggregate cumulant" procedure is performed to obtain a normalized polyspectra of the phase-only wavelet. An example implementation of the "deconvolve the base wavelet cumulant from the aggregate cumulant" procedure is described below with reference to FIG. 12. In block 1008, an "determine spectrum of phase-only wavelet" procedure is performed to obtain an estimated phase-only wavelet based on the normalized polyspectra of the phase-only wavelet. An example implementation of the "determine spectrum of phase-only wavelet" procedure is described below with reference to FIG. 13. In block 1009, a "perform phase conditioning on spectrum of phase-only wavelet" procedure is performed to enforce a time constraint on the phase-only wavelet as given in Equation (9). An example implementation of the "perform phase conditioning on spectrum of phase-only wavelet" procedure is described below with reference to FIG. 14. In block 1010, the phase conditioned spectrum of the phase-only wavelet $H_{(j)}(f)$ obtained in block 1009 is transformed from the frequency domain to the time domain to obtain phase-only wavelet h(t). In block 1011, the phase-only wavelet obtained in block 1010 is convolved with the base wavelet obtained in block 1001 to give an estimated source wavelet as described above with reference to Equations (9) and (34). The estimated source wavelet is returned in block 702 of FIG. 7.

Figure 11:
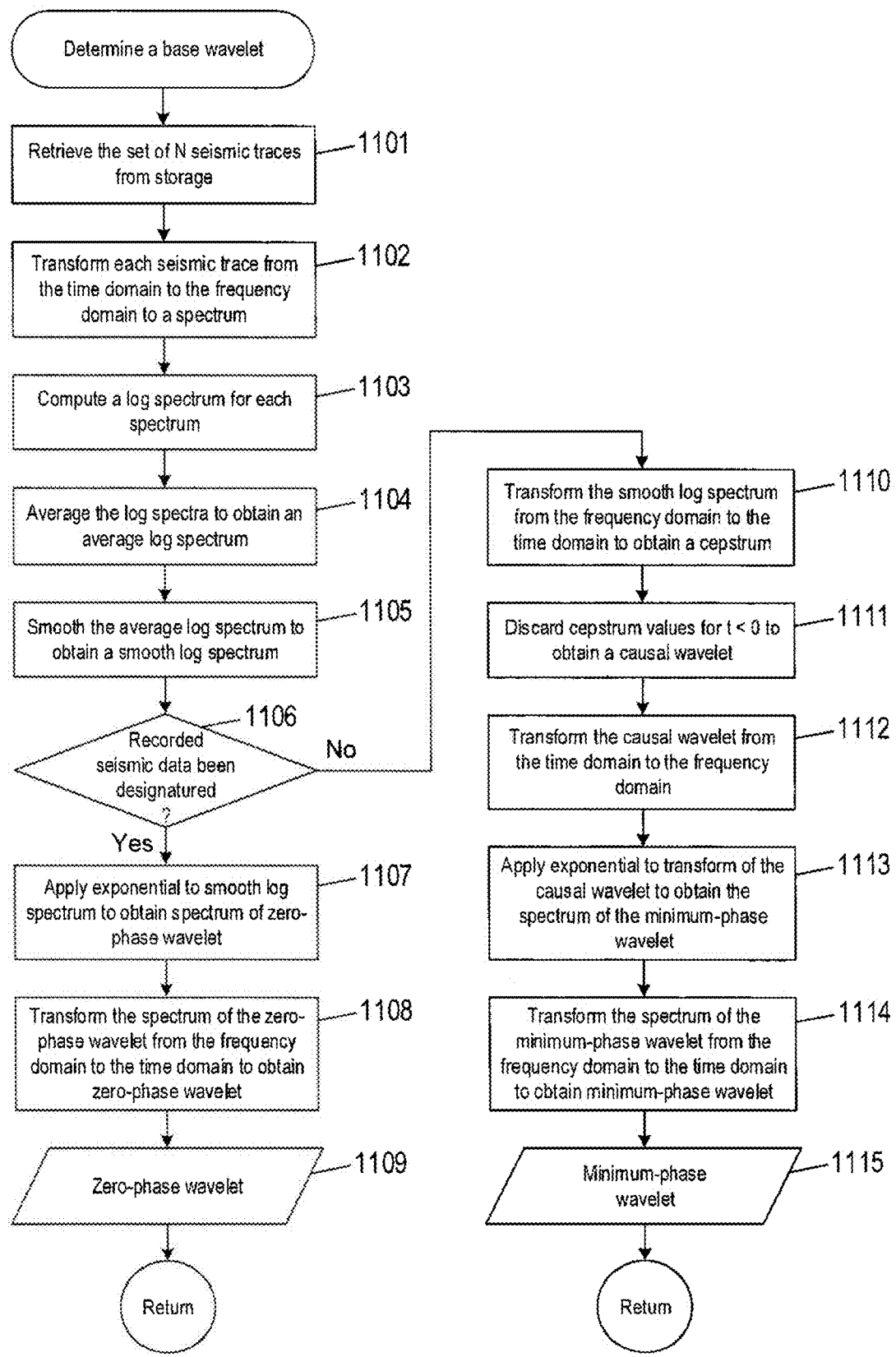
FIG. 11 is a flow diagram illustrating an example implementation of the "determine a base wavelet" procedure performed in FIG. 10.

FIG. 11 is a flow diagram illustrating an example implementation of the "determine a base wavelet" procedure performed in block 1001 of FIG. 10. In block 1101, the set of N seismic traces $\{d_n(t)\}_{n=1}^N$ are retrieved from one or more data storage devices. In block 1102, each of the seismic traces are transformed from the time domain to the frequency domain using a DFFT to obtain a set of N spectra denoted by $\{D_n(f)\}_{n=1}^N$. In block 1103, a log-spectrum log$|D_n(f)|$ is computed for each amplitude spectrum$|D_n(f)|$ of a spectrum $D_n(f)$. In block 1104, the log-spectra obtained in block 1103 are averaged to obtain an average log spectrum as described above with reference to Equation (10). In block 1105, the average log-spectrum is smoothed using data smoothing to obtain a smooth log-spectrum as described above with reference to Equation (11). In decision block 1106, when the recorded seismic data has been designatured, control flows to block 1107. In block 1107, the exponential of the smooth log-spectrum gives the spectrum of the zero-phase wavelet $W_{zero}(f)$ as described above with reference to Equation (12). In block 1108, the spectrum of the zero-phase wavelet $W_{zero}(f)$ is transformed from the frequency domain using an IDFFT to obtain a zero-phase wavelet $w_{zero}(t)$ in the time domain at block 1109. In block 1110, the smooth log-spectrum obtained in block 1105 is transformed from the frequency domain using an IDFFT to obtain a cepstrum $\hat{w}_{cep}(t)$. In block 1111, a causal wavelet $\hat{w}+(t)$ is determined by discarding values of the cepstrum $\hat{w}_{cep}(t)$ for t<0 as described above with reference to Equation (13). In block 1112, the causal wavelet $\hat{w}+(t)$ obtained in block 1111 is transformed from the frequency domain to the time domain to obtain the Fourier transform $\widetilde{W}+(f)$. In block 1113, the exponential of the Fourier $\widetilde{W}+(f)$ gives the spectrum of the minimum-phase wavelet $W_{min}(f)$ as described above with reference to Equation (14). In block 1114, the spectrum of the minimum-phase wavelet is transformed from the frequency domain using an IDFFT to obtain a minimum-phase wavelet $w_{min}(t)$ in the time domain at block 1115. The base wavelet denoted by $w_0(t)$ in Equation (9) represents the zero-phase wavelet $w_{zero}(t)$ output in block 1109 or represents the minimum-phase wavelet $w_{min}(t)$ output in block 1115, depending on whether the recorded seismic data has been designatured.

Figure 12:
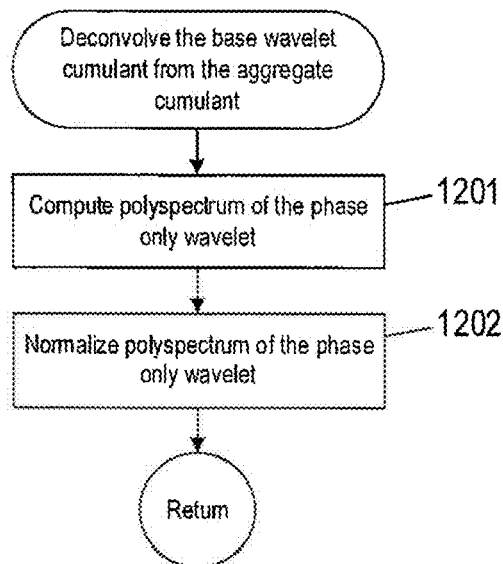
FIG. 12 is a flow diagram of the "deconvolve the base wavelet cumulant from the aggregate cumulant" procedure performed in FIG. 10.

FIG. 12 is a flow diagram of the "deconvolve the base wavelet cumulant from the aggregate cumulant" procedure performed in block 1007 of FIG. 10. In block 1201, the polyspectrum of the phase-only wavelet cumulant is computed based on the base wavelet cumulant obtained in block 1003 of FIG. 10 and the polyspectrum of the aggregate cumulant obtained in block 1006 of FIG. 10 as described above with reference to Equation (18). In block 1202, the polyspectrum of the phase-only wavelet is normalized to obtain the normalized polyspectrum of the phase-only wavelet as described above with reference to Equation (20).

Figure 13:
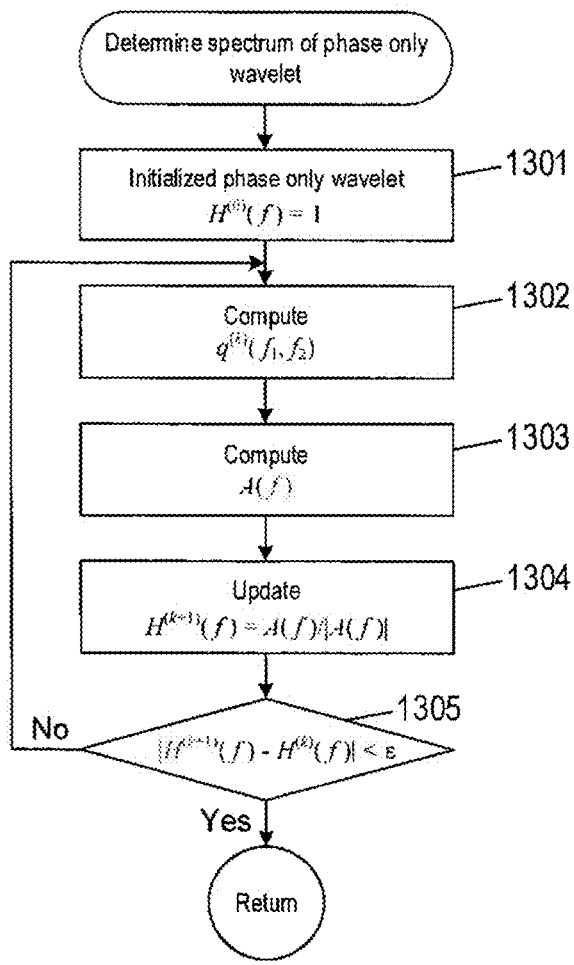
FIG. 13 is a flow diagram of the "determine spectrum of phase-only wavelet" procedure performed in FIG. 10.

FIG. 13 is a flow diagram of the "determine spectrum of phase-only wavelet" procedure performed in block 1008 of FIG. 10. In block 1301, the spectrum of the phase-only wavelet is initialized as described above with reference to Equation (22). In block 1302, a partial polyspectrum of the phase-only wavelet is computed as described above with reference to Equation (23). In block 1303, an estimated spectrum of the phase-only wavelet is computed as described above with reference to Equation (24). In block 1304, the estimated spectrum of the phase-only wavelet is updated as described above with reference to Equation (26). In decision block 1305, the iterative process of determining the spectrum of the phase-only wavelet ends when the condition in Equation (27) is satisfied.

Figure 14:
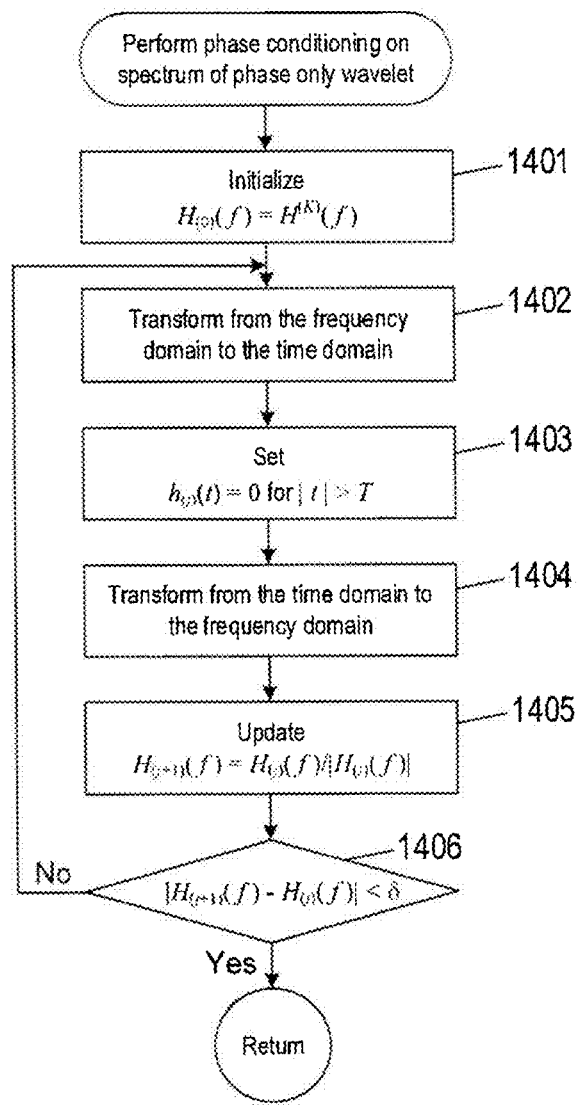
FIG. 14 is a flow diagram of the "perform phase conditioning on spectrum of the phase-only wavelet" procedure performed in FIG. 10.

FIG. 14 is a flow diagram of the "perform phase conditioning on spectrum of the phase-only wavelet" procedure performed in block 1009 of FIG. 10. In block 1401, the spectrum of the phase-only wavelet $H^{(K)}(f)$ output from FIG. 13 is used to initialize a phase conditioned spectrum of the phase-only wavelet as described above with reference to Equation (28). In block 1402, the phase conditioned spectrum $H_{(j)}(f)$ is transformed from the frequency domain to the time domain to obtain a phase conditioned phase-only wavelet $h_{(j)}(t)$. In block 1403, values of the phase conditioned phase-only wavelet with time outside the time gap are muted by $h_{(j)}(t)=0$ for $|t|>T$, as described above with reference to Equation (9). In block 1404, phase conditioned phase-only wavelet $h_{(j)}(t)$ for $|t| \leq T$ is transformed from the time domain to the frequency domain to obtain the phase conditioned spectrum $H'_{(j)}(f)$ of the phase-only wavelet. In block 1405, the phase conditioned spectrum $H'_{(j)}(f)$ is updated as described above with reference to Equation (29). In decision block 1406, the iterative process of phase conditioning the spectrum of the phase-only wavelet ends when the condition in Equation (30) is satisfied.

Figure 15:
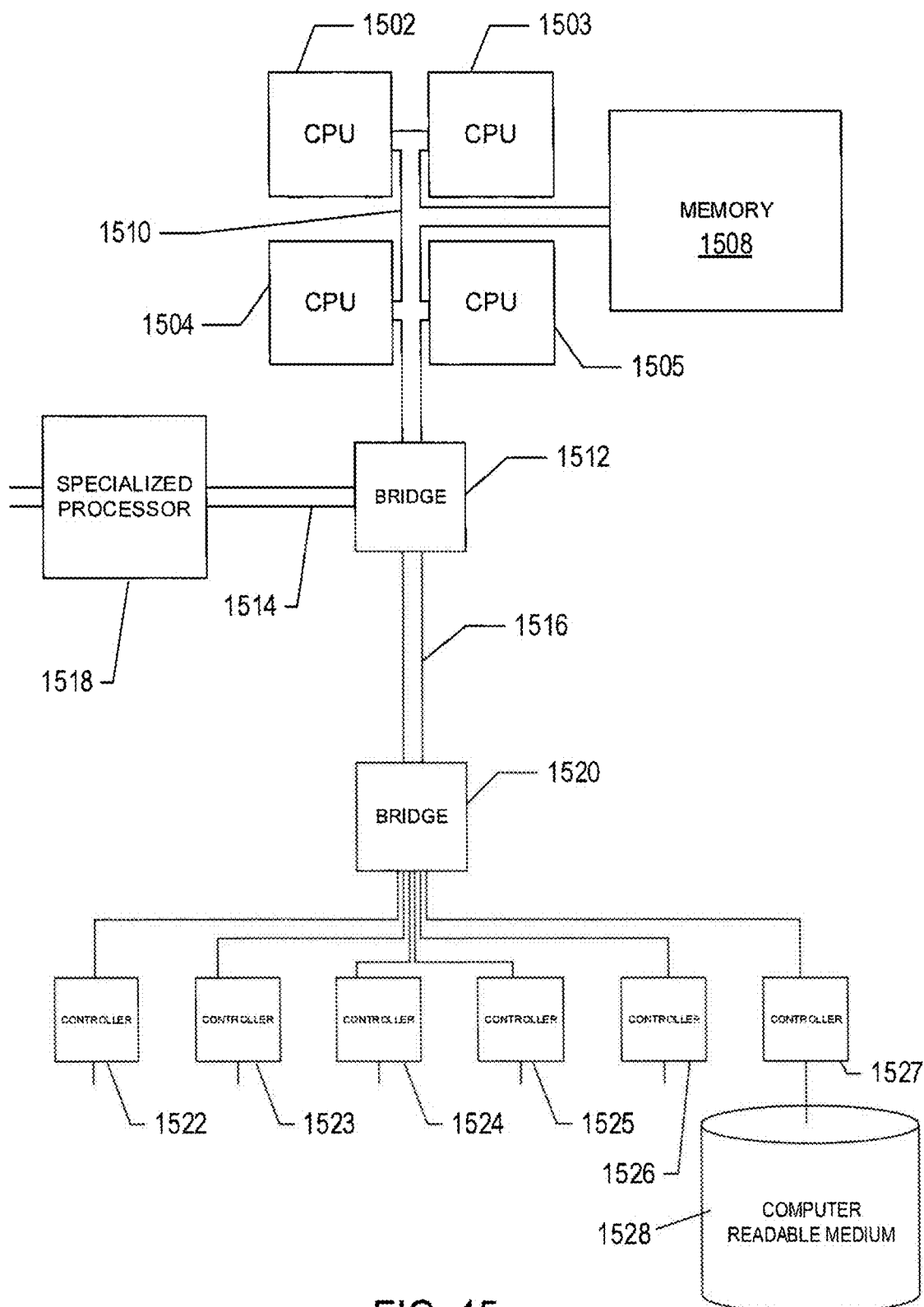
FIG. 15 shows an example computer system that may be used to execute an efficient process for estimating a source wavelet and using the estimated source wavelet to determine properties of a subterranean formation.

FIG. 15 shows an example computer system that may be used to execute an efficient process for estimating a source wavelet and using the estimated source wavelet to determined properties of a subterranean formation and therefore represents a geophysical-analysis data-processing system. The internal components of many small, mid-sized, and large computer systems as well as specialized processor-based storage systems can be described with respect to this generalized architecture, although each system may feature many additional components, subsystems, and similar, parallel systems with architectures similar to this generalized architecture. The computer system contains one or multiple central processing units ("CPUs") 1502-1505, one or more electronic memories 1508 interconnected with the CPUs by a CPU/memory-subsystem bus 1510 or multiple busses, a first bridge 1512 that interconnects the CPU/memory-subsystem bus 1510 with additional busses 1514 and 1516, or other types of high-speed interconnection media, including multiple, high-speed serial interconnects. The busses or serial interconnections, in turn, connect the CPUs and memory with specialized processors, such as a graphics processor 1518, and with one or more additional bridges 1520, which are interconnected with high-speed serial links or with multiple controllers 1522-1527, such as controller 1527, that provide access to various different types of computer-readable media, such as computer-readable medium 1528, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1528 is a data-storage device, including electronic memory, optical or magnetic disk drive, a magnetic tape drive, USB drive, flash memory and other such data-storage device. The computer-readable medium 1528 can be used to store machine-readable instructions that encode the computational methods described above and can be used to store encoded data, during store operations, and from which encoded data can be retrieved, during read operations, by computer systems, data-storage systems, and peripheral devices.

The processes and systems disclosed herein may be used to manufacture a geophysical data product indicative of properties of a subterranean formation. The properties include structure, composition, and lithology of a subterranean formation. A geophysical data product may be manufactured by using the processes and systems described herein to generate geophysical data and store the geophysical data in a computer-readable medium 1528. The geophysical data may be pressure data, vertical velocity data, upgoing and downgoing wavefields, an estimated source wavelet, PSTM image of a subterranean formation, a velocity model of a subterranean formation, an impedance model of a subterranean formation, a seismic tie to well log, and any image of a subterranean formation computed using the processes and systems described herein. The geophysical data product may be produced offshore (i.e., by equipment on the survey vessel 102) or onshore (i.e., at a computing facility on land), or both.

Results

Figure 16A:
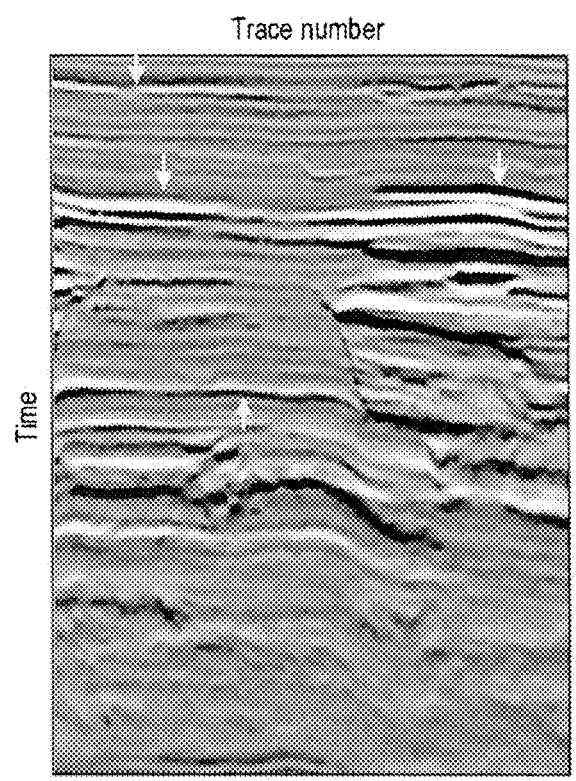
FIGS. 16A-16C show plots of poststack time migrated images before and after phase correction using an estimated source wavelet.
Figure 16C:
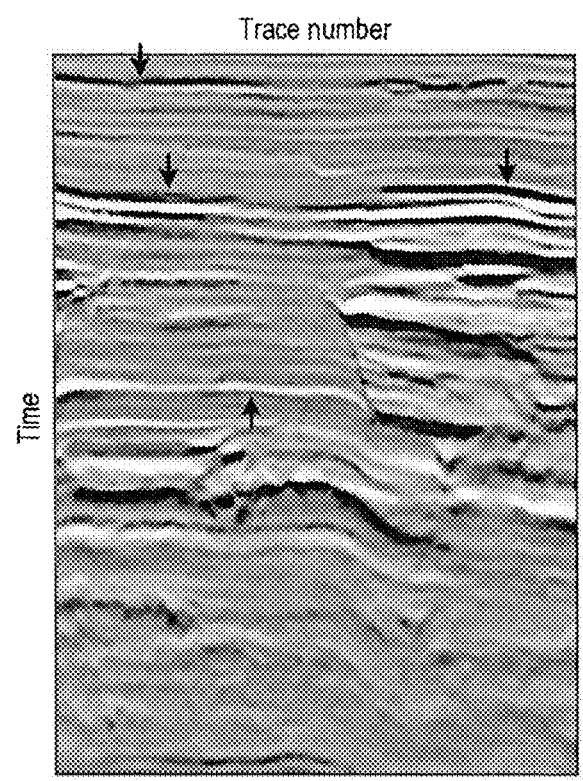
Figure 16B:
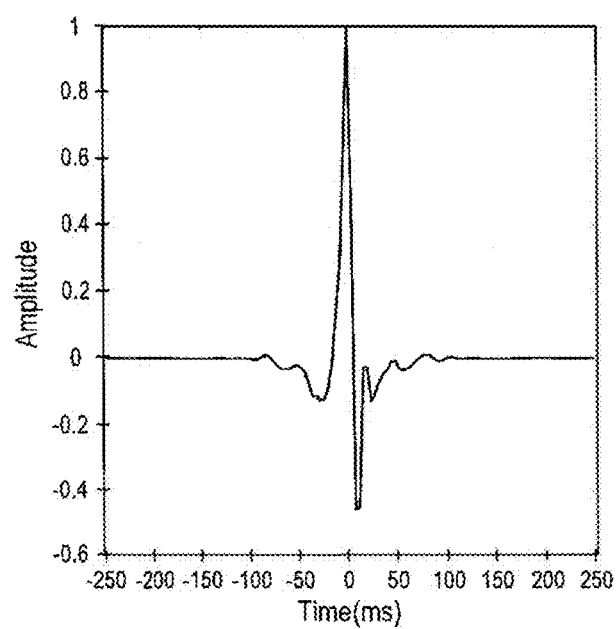

FIG. 16A shows a PSTM image obtained from seismic data recorded in an actual survey as described above with reference to FIG. 7D. The PSTM image is a window with a time length of 1000 ms and encompasses 200 traces. FIG. 16B shows a plot of an estimated source wavelet with a length of 500 ms that was obtained from the PSTM image in accordance with the methods described above with to FIGS. 10-14. FIG. 16C shows a PSTM image after performing phase correction with the estimate source wavelet as described above with reference to FIG. 7D. White arrows in FIG. 16A point to reflectors and subterranean features. Black arrows in FIG. 16C point to the same reflectors and subterranean features but the reflectors and features have higher resolution than the corresponding reflectors and features shown in FIG. 16A.

FIG. 17A shows a plot of a reflectivity time series. Each peak corresponds to a reflection event that maps to an interface between layers with different impedance of a subterranean formation. FIG. 17B shows an example of zero-phase wavelet. FIG. 17C shows a synthetic seismic trace obtained by convolving the zero-phase wavelet with the reflectivity time series in FIG. 17A.

FIG. 18A shows a plot of a true source wavelet (solid curve) and an estimated source wavelet (dashed curve) obtained as described above using a time gap T=20 ms and a zero-phase base wavelet. The amplitude of the estimated source wavelet closely matches the amplitude of the true source wavelet and is non-jittery, leading to a smooth estimated source wavelet. FIG. 18B shows a plot of power spectra of the true source wavelet (solid curve) and estimated source wavelet (dashed curve). FIG. 18C shows a plot of phase spectra of the true source wavelet (solid curve) and phase of estimated source wavelet (dashed curve). The power spectrum and phase spectrum of the estimated source wavelet compares closely to the power spectrum and the phase spectrum of the true source wavelet. In FIG. 18C, the phase of the estimated source wavelet is unbiased and fluctuates around the true phase.

It is appreciated that the previous description of the disclosed embodiments is provided to enable any person skilled in the art to make or use the present disclosure. Various modifications to the embodiments will be apparent to those skilled in the art, and the generic principles defined herein may be applied to other embodiments without departing from the spirit or scope of the disclosure. Thus, the present disclosure is not intended to be limited strictly to the embodiments shown herein but is to be accorded the widest scope consistent with the principles and novel features disclosed herein.

The invention claimed is:

1. In a process for determining properties of a subterranean formation from seismic data recorded in a seismic survey of the subterranean formation, the improvement comprising:
   determining a base wavelet based on the recorded seismic traces;
   determining a phase-only wavelet based on the base wavelet and the recorded seismic data;
   convolving the base wavelet with the phase-only wavelet to obtain an estimated source wavelet; and
   determining properties of the subterranean formation based on the estimated source wavelet and the recorded seismic data, thereby the properties revealing structural information regarding the subterranean formation.

2. The process of claim 1 wherein the base wavelet comprises a zero-phase wavelet when the recorded seismic traces have been designatured.

3. The process of claim 1 wherein the base wavelet comprises a minimum-phase wavelet when the recorded seismic traces have not been designatured.

4. The process of claim 1 wherein determining the phase-only wavelet comprises:
computing a seismic trace cumulant for each seismic trace;
combining the seismic trace cumulants to obtain an aggregate cumulant;
determining a polyspectrum of the aggregate cumulant;
determining a base wavelet cumulant;
determining a polyspectrum of the base wavelet cumulant;
determining a polyspectrum of a phase-only wavelet cumulant based on the polyspectrum of the aggregate cumulant and the polyspectrum of the base wavelet cumulant;
determining a spectrum of the phase-only wavelet based on the polyspectrum of the phase-only wavelet cumulant; and
transforming the spectrum of the phase-only wavelet from a frequency domain to a time domain to obtain the phase-only wavelet.

5. The process of claim 1 wherein determining the phase-only wavelet comprises an iterative process of
computing an estimated un-normalized spectrum of the phase-only wavelet; and
normalizing the estimated un-normalized spectrum of the phase-only wavelet to obtain an updated spectrum of the phase-only wavelet.

6. The process of claim 1 wherein determining the phase-only wavelet comprises iteratively muting phase-only wavelet values located outside a user selected time gap.

7. The process of claim 1 wherein determining properties of the subterranean formation based on the estimated source wavelet and the recorded seismic data comprises determining a poststack time migrated ("PSTM") image of the subterranean formation, the PSTM image revealing structure of the subterranean formation.

8. The process of claim 1 wherein determining properties of the subterranean formation based on the estimated source wavelet and the recorded seismic data comprises determining a velocity model of the subterranean formation, the velocity model revealing lithology and composition of structures within the subterranean formation.

9. The process of claim 1 wherein determining properties of the subterranean formation based on the estimated source wavelet and the recorded seismic data comprises determining a impedance model of the subterranean formation, the impedance model revealing lithology and composition of structures within the subterranean formation.

10. A computer system for determining properties of a subterranean formation, the system comprising:
one or more processors;
one or more data-storage devices; and
machine-readable instructions stored in the one or more data-storage devices that when executed using the one or more processors controls the system to perform operations comprising:
determining a base wavelet based on recorded seismic traces obtained in a seismic survey of the subterranean formation;
determining a phase-only wavelet based on the base wavelet and the recorded seismic data;
convolving the base wavelet with the phase-only wavelet to obtain an estimated source wavelet; and
determining properties of the subterranean formation based on the estimated source wavelet and the recorded seismic data.

11. The computer system of claim 10 wherein the base wavelet comprises a zero-phase wavelet when the recorded seismic traces have been designatured.

12. The computer system of claim 10 wherein the base wavelet comprises a minimum-phase wavelet when the recorded seismic traces have not been designatured.

13. The computer system of claim 10 wherein determining the phase-only wavelet comprises:
computing a seismic trace cumulant for each seismic trace;
combining the seismic trace cumulants to obtain an aggregate cumulant;
determining a polyspectrum of the aggregate cumulant;
determining a base wavelet cumulant;
determining a polyspectrum of the base wavelet cumulant;
determining a polyspectrum of a phase-only wavelet cumulant based on the polyspectrum of the aggregate cumulant and the polyspectrum of the base wavelet cumulant;
determining a spectrum of the phase-only wavelet based on the polyspectrum of the phase-only wavelet cumulant; and
transforming the spectrum of the phase-only wavelet from a frequency domain to a time domain to obtain the phase-only wavelet.

14. The computer system of claim 10 wherein determining the phase-only wavelet comprises an iterative process of performing
computing an estimated un-normalized spectrum of the phase-only wavelet; and
normalizing the estimated un-normalized spectrum of the phase-only wavelet to obtain an updated spectrum of the phase-only wavelet.

15. The computer system of claim 10 wherein determining the phase-only wavelet comprises iteratively muting phase-only wavelet values located outside a user selected time gap.

16. The computer system of claim 10 wherein determining properties of the subterranean formation based on the estimated source wavelet and the recorded seismic data comprises determining a poststack time migrated ("PSTM") image of the subterranean formation, the PSTM image revealing structure of the subterranean formation.

17. The computer system of claim 10 wherein determining properties of the subterranean formation based on the estimated source wavelet and the recorded seismic data comprises determining a velocity model of the subterranean formation, the velocity model revealing lithology and composition of structures within the subterranean formation.

18. The computer system of claim 10 wherein determining properties of the subterranean formation based on the estimated source wavelet and the recorded seismic data comprises determining a impedance model of the subterranean formation, the impedance model revealing lithology and composition of structures within the subterranean formation.

19. A non-transitory computer-readable medium encoded with machine-readable instructions that implement a method performed by one or more processors of a computer system to perform operations comprising:
determining a base wavelet based on recorded seismic traces obtained in a seismic survey of a subterranean formation;

determining a phase-only wavelet based on the base wavelet and the recorded seismic data;
convolving the base wavelet with the phase-only wavelet to obtain an estimated source wavelet; and
determining properties of the subterranean formation based on the estimated source wavelet and the recorded seismic data.

20. The medium of claim 19 wherein the base wavelet comprises a zero-phase wavelet when the recorded seismic traces have been designatured.

21. The medium of claim 19 wherein the base wavelet comprises a minimum-phase wavelet when the recorded seismic traces have not been designatured.

22. The medium of claim 19 wherein determining the phase-only wavelet comprises:
computing a seismic trace cumulant for each seismic trace;
combining the seismic trace cumulants to obtain an aggregate cumulant;
determining a polyspectrum of the aggregate cumulant;
determining a base wavelet cumulant;
determining a polyspectrum of the base wavelet cumulant;
determining a polyspectrum of a phase-only wavelet cumulant based on the polyspectrum of the aggregate cumulant and the polyspectrum of the base wavelet cumulant;
determining a spectrum of the phase-only wavelet based on the polyspectrum of the phase-only wavelet cumulant; and
transforming the spectrum of the phase-only wavelet from a frequency domain to a time domain to obtain the phase-only wavelet.

23. The medium of claim 19 wherein determining the phase-only wavelet comprises an iterative process of
computing an estimated un-normalized spectrum of the phase-only wavelet; and
normalizing the estimated un-normalized spectrum of the phase-only wavelet to obtain an updated spectrum of the phase-only wavelet.

24. The medium of claim 19 wherein determining the phase-only wavelet comprises iteratively muting phase-only wavelet values located outside a user selected time gap.

25. The medium of claim 19 wherein determining properties of the subterranean formation based on the estimated source wavelet and the recorded seismic data comprises determining a poststack time migrated ("PSTM") image of the subterranean formation, the PSTM image revealing structure of the subterranean formation.

26. The medium of claim 19 wherein determining properties of the subterranean formation based on the estimated source wavelet and the recorded seismic data comprises determining a velocity model of the subterranean formation, the velocity model revealing lithology and composition of structures within the subterranean formation.

27. The medium of claim 19 wherein determining properties of the subterranean formation based on the estimated source wavelet and the recorded seismic data comprises determining a impedance model of the subterranean formation, the impedance model revealing lithology and composition of structures within the subterranean formation.

28. Apparatus for determining properties of a subterranean formation from seismic traces recorded in a seismic survey of the subterranean formation, the apparatus comprising:
a means for determining a base wavelet based on the recorded seismic traces;
a means for determining a phase-only wavelet based on the base wavelet and the recorded seismic data;
a means for convolving the base wavelet with the phase-only wavelet to obtain an estimated source wavelet; and
a means for determining properties of the subterranean formation is based on the estimated source wavelet and the recorded seismic data.

29. The apparatus of claim 28 wherein the base wavelet comprises a zero-phase wavelet when the recorded seismic traces have been designatured.

30. The apparatus of claim 28 wherein the base wavelet comprises a minimum-phase wavelet when the recorded seismic traces have not been designatured.

31. The apparatus of claim 28 wherein the means for determining the phase-only wavelet comprises:
computes a seismic trace cumulant for each seismic trace;
combines the seismic trace cumulants to obtain an aggregate cumulant;
determines a polyspectrum of the aggregate cumulant;
determines a base wavelet cumulant;
determines a polyspectrum of the base wavelet cumulant;
determines a polyspectrum of a phase-only wavelet cumulant based on the polyspectrum of the aggregate cumulant and the polyspectrum of the base wavelet cumulant;
determines a spectrum of the phase-only wavelet based on the polyspectrum of the phase-only wavelet cumulant; and
transforms the spectrum of the phase-only wavelet from a frequency domain to a time domain to obtain the phase-only wavelet.

32. The apparatus of claim 28 wherein the means for determining the phase-only wavelet iteratively
computes an estimated un-normalized spectrum of the phase-only wavelet; and
normalizes the estimated un-normalized spectrum of the phase-only wavelet to obtain an updated spectrum of the phase-only wavelet.

33. The apparatus of claim 28 wherein means for determining the phase-only wavelet iteratively mutes phase-only wavelet values located outside a user selected time gap.

34. The apparatus of claim 28 wherein the means for determining properties of the subterranean formation based on the estimated source wavelet and the recorded seismic data determines a poststack time migrated ("PSTM") image of the subterranean formation, the PSTM image revealing structure of the subterranean formation.

35. The apparatus of claim 28 wherein the means for determining properties of the subterranean formation based on the estimated source wavelet and the recorded seismic data determines a velocity model of the subterranean formation, the velocity model revealing lithology and composition of structures within the subterranean formation.

36. The apparatus of claim 28 wherein the means for determining properties of the subterranean formation based on the estimated source wavelet and the recorded seismic data determines an impedance volume of the subterranean formation, the impedance model revealing lithology and composition of structures within the subterranean formation.

37. A method for manufacturing a geophysical data product, the method comprising:
determining a base wavelet based on recorded seismic traces obtained in a seismic survey of a subterranean formation;
determining a phase-only wavelet based on the base wavelet and the recorded seismic data;

convolving the base wavelet with the phase-only wavelet to obtain an estimated source wavelet;
determining properties of the subterranean formation based on the estimated source wavelet and the recorded seismic data; and
storing the properties in a computer-readable medium.

* * * * *

UNITED STATES PATENT AND TRADEMARK OFFICE
CERTIFICATE OF CORRECTION

PATENT NO. : 11,604,299 B2
APPLICATION NO. : 17/126911
DATED : March 14, 2023
INVENTOR(S) : Maiza Bekara Page 1 of 2

It is certified that error appears in the above-identified patent and that said Letters Patent is hereby corrected as shown below:

In the Specification

In Column 2, Line 5 delete "ofHigher" and insert -- of Higher --.

In Column 2, Line 65 delete "assumptions." and insert -- assumptions, --.

In Column 5, Line 53 delete "$p(\vec{x}_r, \overline{x}_s, t)$" and insert -- $p(\vec{x}_r, \vec{x}_s, t)$ --.

In Column 5, Line 53 delete "," and insert -- $\vec{x}_r$ --.

In Column 5, Line 64 delete "$g_{\vec{n}}(\overline{x}_r, \overline{x}_s, t)$" and insert -- $g_{\vec{n}}(\vec{x}_r, \vec{x}_s, t)$ --.

In Column 6, Line 1 delete "$v_{\vec{n}}(\overline{x}_r, \overline{x}_s, t)$" and insert -- $v_{\vec{n}}(\vec{x}_r, \vec{x}_s, t)$ --.

In Column 6, Line 3 delete "$a_{\vec{n}}(\overline{x}_r, \overline{x}_s, t)$" and insert -- $a_{\vec{n}}(\vec{x}_r, \vec{x}_s, t)$ --.

In Column 6, Line 25 delete "$\overline{n}=(0.0, z)$" and insert -- $\vec{n} = (0,0,z)$ --.

In Column 6, Line 25 delete "$g_z(\vec{x}_r, \overline{x}_s, t)$" and insert -- $g_z(\vec{x}_r, \vec{x}_s, t)$ --.

In Column 6, Line 26 delete "$v_z(\overline{x}_r, \overline{x}_s, t)$" and insert -- $v_z(\vec{x}_r, \vec{x}_s, t)$ --.

In Column 6, Line 27 delete "$a_z(\overline{x}_r, \overline{x}_s, t)$" and insert -- $a_z(\vec{x}_r, \vec{x}_s, t)$ --.

Signed and Sealed this
Twenty-seventh Day of August, 2024

Katherine Kelly Vidal
*Director of the United States Patent and Trademark Office*

CERTIFICATE OF CORRECTION (continued)
U.S. Pat. No. 11,604,299 B2

In Column 6, Line 30 delete "$\vec{\tilde{n}}_1$ and $\vec{\tilde{n}}_2$" and insert -- $\vec{n}_1$ and $\vec{n}_2$ --.

In Column 6, Line 31 delete "n̄ (i.e., n̄·n̄₁=n̄·n̄₂=0" and insert -- $\vec{n}$ (i.e., $\vec{n} \cdot \vec{n}_1 = \vec{n} \cdot \vec{n}_2 = 0)$ --.

In Column 6, Line 32 delete "(i.e., n̄₁·n̄₂=0)." and insert -- (i.e., $\vec{n}_1 \cdot \vec{n}_2 = 0$). --.

In Column 6, Lines 36-37 delete "v$_z$(x̄$_r$, x̄$_s$, t)," and insert -- $v_z(\vec{x}_r, \vec{x}_s, t)$ --.

In Column 6, Line 39 delete "v$_x$(x̄$_r$, x̄$_s$, t)," and insert -- $v_x(\vec{x}_r, \vec{x}_s, t)$ --.

In Column 6, Line 42 delete "v$_y$(x̄ $_r$, x̄$_s$, t)." and insert -- $v_y(\vec{x}_r, \vec{x}_s, t)$ --.

In Column 7, Line 15 delete "$d(\bar{x}_r, \bar{x}_s, t) = \{A(\bar{x}_r, \bar{x}_s, t_l)\}_{l=0}^{L-1}$" and insert -- $d(\vec{x}_r, \vec{x}_s, t) = \{A(\vec{x}_r, \vec{x}_s, t_l)\}_{l=0}^{L-1}$ --.

In Column 7, Line 25 delete "x̄$_r$" and insert -- $\vec{x}_r$ --.

In Column 7, Line 32 delete "x̄$_r$=x̄$_r$(t)" and insert -- $\vec{x}_r = \vec{x}_r(t)$ --.

In Column 7, Line 32 delete "x̄$_s$=x̄$_s$(t)" and insert -- $\vec{x}_s = \vec{x}_s(t)$ --.

In Column 10, Line 62 delete "spectrum." and insert -- spectrum, --.

In Column 22, Line 36 delete "DFFT:" and insert -- DFFT; --.

In Column 22, Line 37 delete "f$_1$·f$_2$," and insert -- $f_1, f_2$ --.

In Column 23, Line 54 delete "spectrum|D$_n$(f)|" and insert -- spectrum $|D_n(f)|$ --.